(12) United States Patent
Alston et al.

(10) Patent No.: US 8,030,880 B2
(45) Date of Patent: Oct. 4, 2011

(54) POWER GENERATION AND BATTERY MANAGEMENT SYSTEMS

(75) Inventors: Gerald Allen Alston, Union City, CA (US); Justin Dobbs, Union City, CA (US); Larry Knight, Union City, CA (US)

(73) Assignee: Glacier Bay, Inc., Union City, CA (US)

( * ) Notice: Subject to any disclaimer, the term of this patent is extended or adjusted under 35 U.S.C. 154(b) by 821 days.

(21) Appl. No.: 12/149,095

(22) Filed: Apr. 25, 2008
(Under 37 CFR 1.47)

(65) Prior Publication Data
US 2009/0107743 A1    Apr. 30, 2009

Related U.S. Application Data

(63) Continuation-in-part of application No. 11/560,160, filed on Nov. 15, 2006, now Pat. No. 7,797,958.

(51) Int. Cl.
*H01M 10/46*     (2006.01)

(52) U.S. Cl. ........................... 320/103; 320/104

(58) Field of Classification Search .................. 320/103, 320/104, 107, 112, 114, 116, 132, 138
See application file for complete search history.

(56) References Cited

U.S. PATENT DOCUMENTS

| | | |
|---|---|---|
| 3,844,130 A | 10/1974 | Wahnish |
| 4,015,182 A | 3/1977 | Erdman |
| 4,359,875 A | 11/1982 | Ohtani |
| 4,658,593 A | 4/1987 | Stenvinkel |
| 4,934,158 A | 6/1990 | Sakano |
| 4,947,657 A | 8/1990 | Kalmbach |
| 5,056,330 A | 10/1991 | Isobe et al. |
| 5,265,435 A | 11/1993 | Richardson |
| 5,501,267 A | 3/1996 | Iritani et al. |
| 5,502,365 A | 3/1996 | Nanbu et al. |
| 5,519,301 A | 5/1996 | Yoshida et al. |

(Continued)

FOREIGN PATENT DOCUMENTS

DE    102 26 089 A1    1/2003

(Continued)

OTHER PUBLICATIONS

Zhigan Wu et al., "Sensorless Brushless DC Motor Drive for Air-conditioner Compressor," Electrical Machines and Systems, 2001, pp. 968-971, Fifth International Conference, vol. 2, Shanghai, China.

(Continued)

*Primary Examiner* — Edward Tso
(74) *Attorney, Agent, or Firm* — Foley & Lardner LLP

(57) ABSTRACT

The disclosed power system may comprise first and second batteries; an electrical power generator; an electrical load powered by at least one of the first battery, the second battery or the electrical power generator; a converter; and a battery management controller. The converter is connected to both the first and second batteries and configured to operate in a neutral mode, a first battery charging mode, or a second battery charging mode. The converter is configured to create a voltage difference between the first and second batteries in the charging modes. The battery management controller is configured to monitor the voltage of the first battery and the voltage of the second battery and/or to monitor current flow to and from the first and second batteries. The controller controls operation of the converter to operate in the neutral mode, the first battery charging mode or the second battery charging mode.

22 Claims, 18 Drawing Sheets

U.S. PATENT DOCUMENTS

| | | | |
|---|---|---|---|
| 5,537,831 A | 7/1996 | Isaji et al. | |
| 5,562,538 A | 10/1996 | Suyama | |
| 5,664,429 A | 9/1997 | Isaji | |
| 5,867,996 A | 2/1999 | Takano et al. | |
| 5,899,081 A | 5/1999 | Evans et al. | |
| 5,934,089 A | 8/1999 | Nakagawa et al. | |
| 6,044,651 A | 4/2000 | Reason et al. | |
| 6,048,288 A | 4/2000 | Tsujii et al. | |
| 6,073,456 A | 6/2000 | Kawai et al. | |
| 6,089,034 A | 7/2000 | Lake et al. | |
| 6,109,045 A | 8/2000 | Takenaka | |
| 6,118,678 A * | 9/2000 | Limpaecher et al. | 320/166 |
| 6,204,645 B1 * | 3/2001 | Cullen | 320/102 |
| 6,209,331 B1 | 4/2001 | Lake et al. | |
| 6,230,507 B1 | 5/2001 | Ban et al. | |
| 6,287,081 B1 | 9/2001 | Tamegai et al. | |
| 6,351,957 B2 | 3/2002 | Hara | |
| 6,367,270 B2 | 4/2002 | Niimi et al. | |
| 6,411,059 B2 | 6/2002 | Frugier et al. | |
| 6,470,694 B1 | 10/2002 | Buck et al. | |
| 6,513,341 B2 | 2/2003 | Nakajima | |
| 6,523,361 B2 | 2/2003 | Higashiyama | |
| 6,530,426 B1 | 3/2003 | Kishita et al. | |
| 6,532,926 B1 | 3/2003 | Kuroda et al. | |
| 6,543,243 B2 | 4/2003 | Mohrmann et al. | |
| 6,560,984 B2 | 5/2003 | Bellet | |
| 6,615,595 B2 | 9/2003 | Baruschke et al. | |
| 6,626,003 B1 | 9/2003 | Kortüm et al. | |
| 6,637,230 B2 | 10/2003 | Iwanami et al. | |
| 6,640,562 B2 | 11/2003 | Odachi et al. | |
| 6,644,055 B2 | 11/2003 | Ohta et al. | |
| 6,659,727 B2 | 12/2003 | Major et al. | |
| 6,662,580 B2 | 12/2003 | Suitou et al. | |
| 6,675,596 B2 | 1/2004 | Iwanami et al. | |
| 6,688,121 B2 | 2/2004 | Tada et al. | |
| 6,705,102 B2 | 3/2004 | Adaniya et al. | |
| 6,715,995 B2 | 4/2004 | Kelm et al. | |
| 6,737,756 B1 | 5/2004 | Gale et al. | |
| 6,742,350 B2 | 6/2004 | Suzuki et al. | |
| 6,745,585 B2 | 6/2004 | Kelm et al. | |
| 6,761,037 B2 | 7/2004 | Tsuboi et al. | |
| 6,801,842 B2 | 10/2004 | Egami et al. | |
| 6,830,438 B2 | 12/2004 | Iwanami et al. | |
| 6,889,512 B2 | 5/2005 | Ebara et al. | |
| 6,889,762 B2 | 5/2005 | Zeigler et al. | |
| 6,939,114 B2 | 9/2005 | Iwanami et al. | |
| 6,981,544 B2 | 1/2006 | Iwanami et al. | |
| 7,076,963 B2 | 7/2006 | Higashiyama | |
| 7,150,159 B1 | 12/2006 | Brummett et al. | |
| 7,278,833 B2 | 10/2007 | Higashiyama et al. | |
| 2001/0010261 A1 | 8/2001 | Oomura et al. | |
| 2002/0078700 A1 | 6/2002 | Kelm et al. | |
| 2002/0084769 A1 | 7/2002 | Iritani et al. | |
| 2002/0112489 A1 | 8/2002 | Egawa et al. | |
| 2003/0041603 A1 | 3/2003 | Tada et al. | |
| 2003/0053916 A1 | 3/2003 | Terauchi | |
| 2003/0068232 A1 | 4/2003 | Iwanami et al. | |
| 2003/0070800 A1 | 4/2003 | Ito et al. | |
| 2003/0070849 A1 | 4/2003 | Whittaker | |
| 2003/0141049 A1 | 7/2003 | Kennedy | |
| 2003/0201097 A1 | 10/2003 | Zeigler et al. | |
| 2004/0041403 A1 | 3/2004 | Fattic | |
| 2004/0207366 A1 * | 10/2004 | Sung | 320/140 |
| 2005/0109499 A1 | 5/2005 | Iwanami et al. | |
| 2005/0132736 A1 | 6/2005 | Grimm et al. | |
| 2005/0285445 A1 | 12/2005 | Wruck et al. | |
| 2006/0032253 A1 | 2/2006 | Lee et al. | |
| 2006/0097577 A1 * | 5/2006 | Kato et al. | 307/10.1 |
| 2006/0102333 A1 | 5/2006 | Zeigler et al. | |
| 2006/0139007 A1 | 6/2006 | Kim | |
| 2006/0151163 A1 | 7/2006 | Zeigler et al. | |
| 2006/0151164 A1 | 7/2006 | Zeigler et al. | |
| 2006/0248907 A1 | 11/2006 | Allen et al. | |
| 2007/0131408 A1 | 6/2007 | Zeigler et al. | |
| 2007/0186573 A1 | 8/2007 | Ziehr et al. | |
| 2007/0299560 A1 | 12/2007 | LaHue et al. | |
| 2008/0014852 A1 | 1/2008 | Mielke et al. | |
| 2008/0110189 A1 | 5/2008 | Alston et al. | |

FOREIGN PATENT DOCUMENTS

| | | |
|---|---|---|
| EP | 1 213 166 A1 | 6/2002 |
| EP | 1 213 166 B1 | 6/2002 |
| EP | 1 285 791 A1 | 2/2003 |
| EP | 1 285 791 B1 | 8/2004 |
| JP | 53-2121 A | 1/1978 |
| JP | 6-106964 A | 4/1994 |
| JP | 10-109531 A | 4/1998 |
| JP | 10-236151 A | 9/1998 |
| JP | 10-291415 A | 11/1998 |
| JP | 2000-108651 A | 4/2000 |
| JP | 2002-81823 A | 3/2002 |
| JP | 2003-48425 A | 2/2003 |
| JP | 2003-211950 A | 7/2003 |
| JP | 2004-44500 A | 2/2004 |
| JP | 2005-126052 A | 5/2005 |
| JP | 2007-50739 A | 3/2007 |
| JP | 2007-99032 A | 4/2007 |
| JP | 2007-168775 A | 7/2007 |
| WO | WO 01/40005 A1 | 6/2001 |
| WO | WO 02/32706 A1 | 4/2002 |
| WO | WO 2006/024168 A1 | 3/2006 |

OTHER PUBLICATIONS

Hiroshi Murakami et al., "Highly Efficient Brushless Motor Design for an Air-conditioner of the Next Generation 42V Vehicle," Industry Applications Conference, 2001, pp. 461-466, Thirty-Sixth Annual Meeting, Osaka, Japan.

Glacier Bay Final Report/Glacier Bay Environmental Control System for Electric and Hybrid Vehicles (ECS) Final Report, Apr. 1998.

DC Airco, DC Powered Airconditioners for 12 and 24 volt cab cooling Brochure.

Sunny Airco 4400 and 9000 Brochure.

Masterflux, Masterflux Variable Speed Brushless DC Refrigeration & Air Conditioning Compressors Brochure.

* cited by examiner

POWER GENERATION AND BATTERY MANAGEMENT SYSTEMS

This application is a continuation-in-part of U.S. patent application Ser. No. 11/560,160 filed on Nov. 15, 2006, which is incorporated by reference herein in its entirety.

BACKGROUND

The present invention relates to a battery management controller to be used with a power generation system in a vehicle.

One example of a power generation system that could benefit from the disclosed battery management controller is a truck HVAC system. However, the present invention is not limited to truck HVAC systems and the reference herein to such a system is for exemplary purposes only.

Truck drivers that move goods across the country may be required to pull over at various times along their journey so as to rest so that they do not become too fatigued. Common places for truck drivers to rest include rest stops, toll plazas, and the like. However, these locations usually do not have any accommodations for the drivers, and as a result they usually remain inside the cab of the truck inside a sleeping compartment. To provide the driver with maximum comfort, the sleeping compartment should be temperature controlled so that the environment in the truck is conducive for the driver to get the rest he or she needs.

Currently, trucks tend to use engine-belt driven compressors for the air conditioning system to circulate and pump refrigerant throughout the vehicle to cool the driving compartments. In addition, an engine-belt driven pump may circulate engine waste heat throughout the driving compartments when heating is required. Unfortunately, these systems have the drawback of not being able to operate when the engine is turned off. As a result, the driver has the choice of either keeping the engine running (which requires additional fuel) so as to run the temperature control system or turning the engine off and not using the air conditioning or heating systems (which may make the driver uncomfortable).

SUMMARY

According to one embodiment of the present invention, a power system to be installed in a vehicle may comprise a first battery having a first battery voltage; a second battery having a second battery voltage; an electrical power generator configured to charge the first battery; an electrical load powered by at least one of the first battery, the second battery or the electrical power generator; a converter; and a battery management controller. The converter is connected to both the first and second batteries and configured to operate in either a neutral mode or a first battery charging mode or a second battery charging mode. The converter is configured to create a voltage difference between the first and second batteries in the charging modes. The battery management controller is configured to monitor the first voltage of the first battery and the second voltage of the second battery and/or to monitor the current flow to and from the first and second batteries. The controller controls the operation of the converter to operate in either the neutral mode, the first battery charging mode or the second battery charging mode. In the second battery charging mode, the converter is configured to adjust the voltage difference between the first battery and the second battery to cause current to flow from the first battery to the second battery to thereby charge the second battery.

According to another embodiment of the present invention, a vehicle power system may comprise an electrical generator driven by an engine of a vehicle; a main battery connected to a secondary battery for supplying current to an electrical load; and a controller. The controller is coupled to the main battery and the secondary battery. The controller is configured to adjust the system so that the main battery is charged by the secondary battery when a state of charge of the main battery is below a predetermined threshold even when a state of charge of the secondary battery is less than the state of charge of the main battery.

According to another embodiment of the present invention, a vehicle may comprise: an interior area including a driver compartment and a sleeper compartment; an interior subsystem comprising a blower and an evaporator; an exterior subsystem; and a liquid phase cooler. The exterior subsystem may comprise a compressor and a condenser, wherein the exterior subsystem is mounted to a location outside the interior area. The interior subsystem may be mounted within the interior area and be operably connected with the exterior subsystem. The liquid phase cooler may comprise an outer tube with two first connectors and an inner tube with two second connectors, wherein the inner tube is placed within the outer tube.

According to another embodiment of the present invention, an air conditioning system for use in an over-the-road vehicle may comprise: a variable-speed compressor for providing refrigerant to a heat exchanger positioned to provide temperature control to an interior compartment of a vehicle; a brushless DC motor operably coupled to the variable-speed compressor; an evaporator; and an controller operably coupled to the motor. The controller may receive electric power from at least one source of electric power operable when an engine of the vehicle is not operating. The controller may modulate compressor speed of the compressor such that the evaporator is maintained at a predetermined evaporator temperature.

It is to be understood that both the foregoing general description and the following detailed description are exemplary and explanatory only, and are not restrictive of the invention as claimed.

BRIEF DESCRIPTION OF THE DRAWINGS

The features, aspects and advantages of the present invention will become apparent from the following description, appended claims, and the accompanying exemplary embodiments shown in the drawings, which are briefly described below.

FIG. 6(*b*) is flow chart showing the operation of the power system during an engine start mode.

FIG. 6(*c*) is a flow chart showing the operation of the power system during a recharging mode.

DETAILED DESCRIPTION

Hereinafter, various embodiments of the present invention will be described in detail with reference to the drawings.

Figure 1:
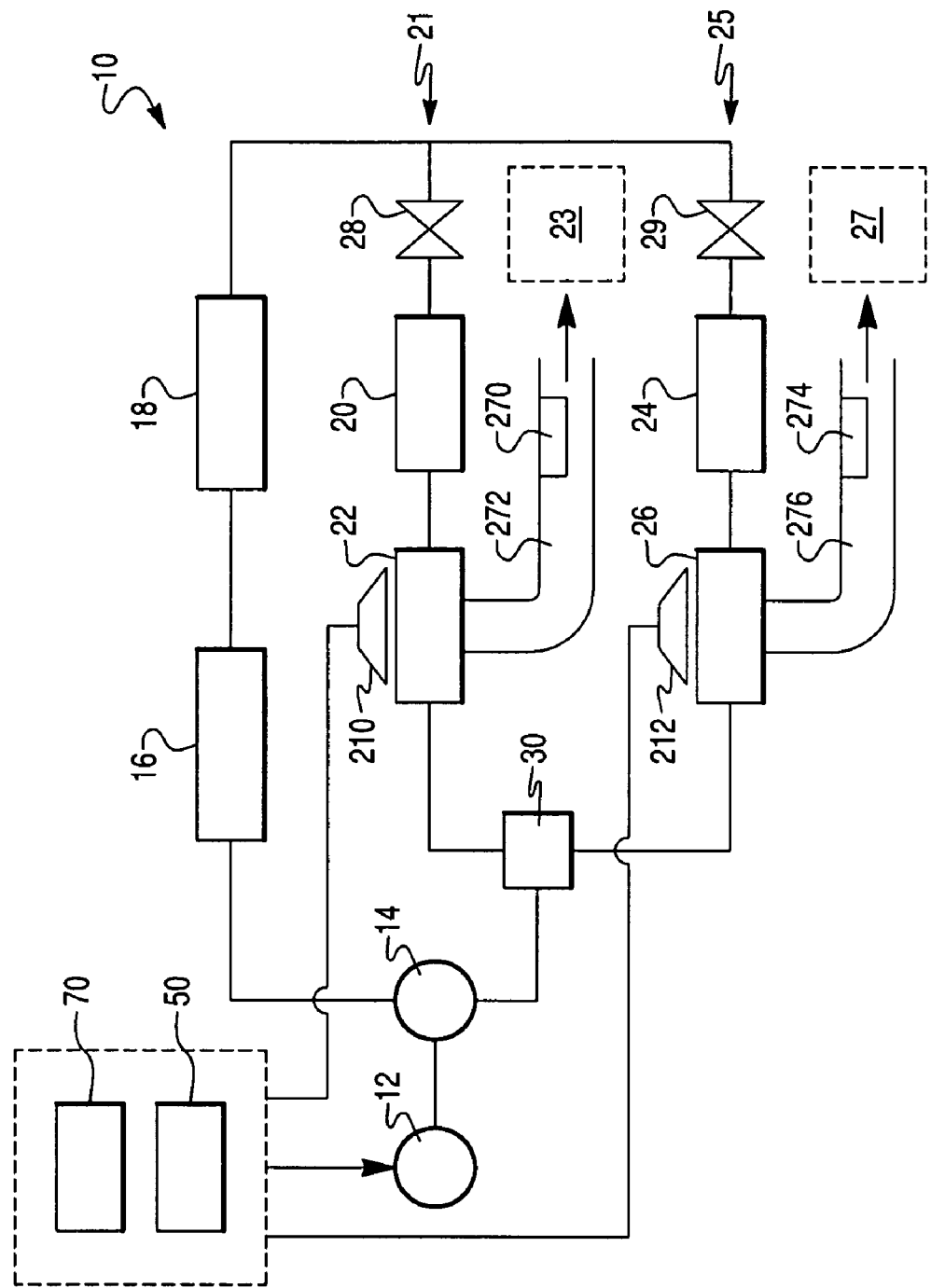
FIG. 1 is a schematic diagram of an HVAC system to be installed in a vehicle.

FIG. 1 is a schematic diagram of an HVAC system to be installed in a vehicle according to an embodiment of the present invention. The HVAC system 10 may comprise a motor 12, a compressor 14, circulation blowers 210 and 212, an HVAC component controller 50, and a power system 70. The motor may be operatively coupled to the compressor 14. The compressor 14 is a stepless continuously variable speed compressor, which is driven by the motor 12. The compressor 14 circulates refrigerant through the condenser 16 to an optional refrigerant receiver and dryer 18. From the refrigerant receiver and dryer 18, the refrigerant then passes to either a first cooling path 21 that cools the driving compartment 23 or a second cooling path 25 that cools the sleeping compartment 27 of the vehicle. As to the first cooling path 21, the refrigerant passes through a refrigerant metering device 20 and an evaporator 22. The refrigerant metering device 20 may or may not be an expansion device, such as a thermostatic expansion valve, a pressure control expansion valve, a capillary tube, or the like, used in the conventional way. In one arrangement, the refrigerant metering device 20 is a metering device feeding refrigerant into the flooded evaporator 22 with no expansion taking place at or near the valve 20, and thus merely meters in liquid refrigerant at a rate sufficient to maintain the correct liquid level in the evaporator. Air is blown over the evaporator 22 by the circulation blower 210. After the air is cooled by the evaporator 22, the air proceeds through an air duct 272 towards the driving compartment 23 of the vehicle.

A second cooling path 25 runs parallel to the first cooling path 21 in which the refrigerant is provided through a refrigerant metering device 24 and an evaporator 26. Air is blown over the evaporator 26 by a circulation blower 212. After the air is cooled by the evaporator 26, the air proceeds through an air duct 276 towards the sleeping compartment 27 of the vehicle. The evaporator 26 of the second cooling path 25 may be smaller than the evaporator 22 of the first cooling path 21 because the sleeping compartment 27 is typically smaller than the driving compartment 23.

The two coolant loops may be selectable through the use of valves 28 and 29. The inclusion of such valves permits the driving compartment 23, the sleeping compartment 27, or both compartments to be air conditioned at a particular time. The valves 28 and 29 may be controlled through the HVAC component controller 50 (to be discussed below). Once the refrigerant passes through the evaporator 22 and/or 26, the refrigerant then passes through an optional refrigerant accumulator 30 before being returned to the compressor 14 to restart the process.

The motor 12 may be any suitable motor. For example, the motor 12 may be a brushless DC motor that is commutated by a square or trapezoidal wave form. In another example, the motor 12 may be a synchronous permanent magnet motor that is commutated with a sine wave. When the motor is driven by a sine wave, additional benefits may be obtained, such as better drive efficiency, better cooling and quieter operation.

Figure 5:
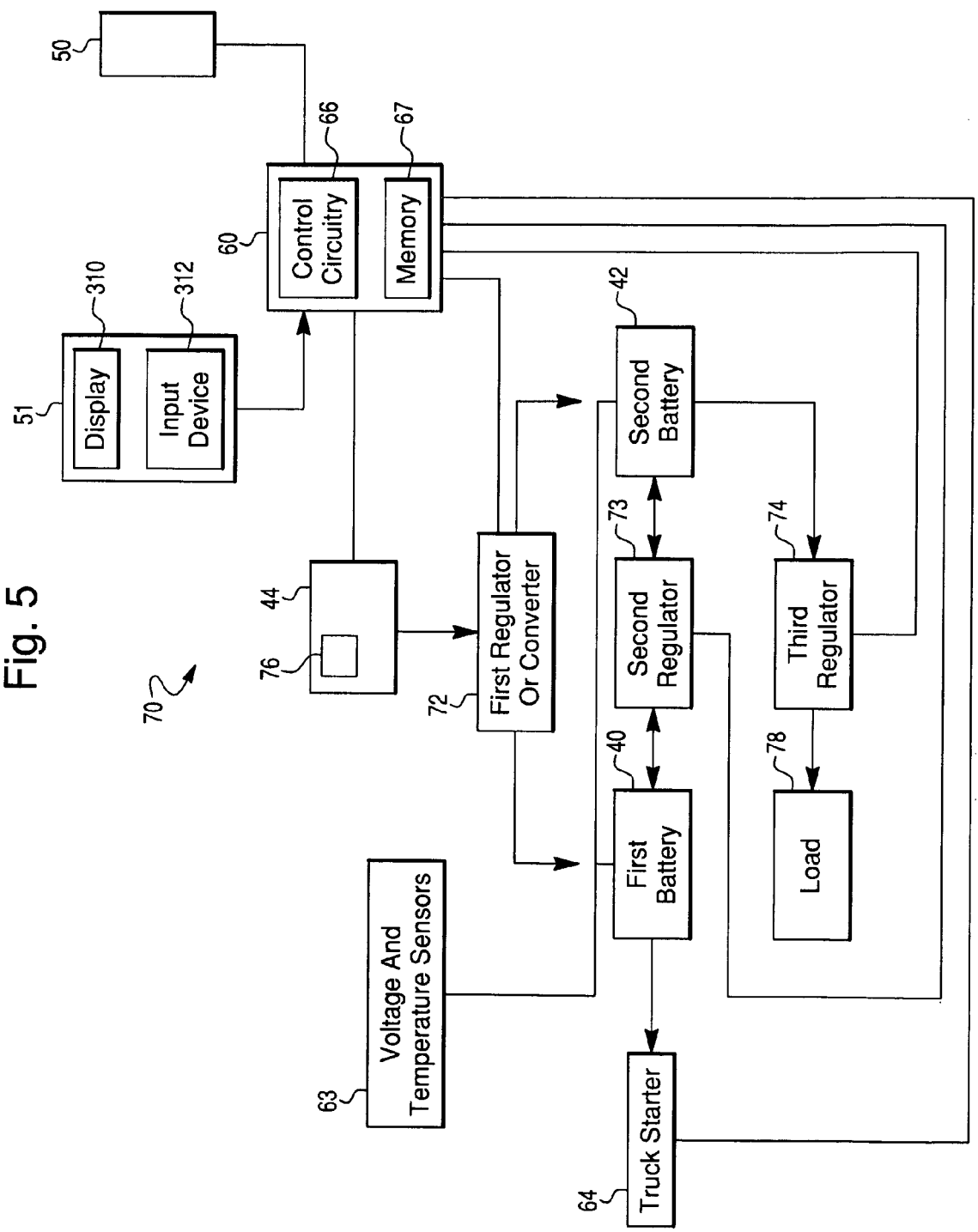
FIG. 5 is a schematic diagram of a power system according to an embodiment of the present invention.

By using a variable speed compressor 14 driven by a brushless DC or a synchronous permanent magnet motor 12, the vehicle's HVAC system may be operated when the engine is turned on or when the engine is turned off. The variable speed compressor 14 also may permit the HVAC system 10 to operate at a lower capacity during the engine off operation to conserve the amount of stored energy available for usage by the system 10. The control for this operation is provided by a HVAC component controller 50 that monitors various system parameters while a battery management controller 60 monitors the availability and status of the power sources on the vehicle and provides power to the HVAC system. The power sources and battery management controller 60 are part of a power system 70, as seen in FIG. 5. As will be described in more detail later, the power system 70 seen in FIG. 5 may have as its power sources a first power source 40, a second power source 42, and/or the vehicle's main electrical power generation system 44.

In a similar manner, the circulation blowers 210 and 212 may also have stepless continuously variable speeds such that the circulation blowers may operate at a lower capacity during the engine off operation to conserve the amount of stored energy available for usage by the HVAC system 10. The control for this operation is also provided by the HVAC component controller 50.

The battery management controller 60 is configured such that the vehicle's HVAC system 10 is capable of being powered by the vehicle's main electrical power generation system 44, which is available while the vehicle's engine is operating. When the vehicle's engine is off, the HVAC system 10 may be powered with a first power source 40 and/or a second power source 42 depending on the power levels of the power sources (as will be described later). In one embodiment, the first power source 40 may be the vehicle's one or more starter batteries while the second power source 42 may be one or more auxiliary deep-cycle batteries.

In the HVAC system 10, the motor driven compressor 14 may have the ability to modulate its output from full capacity to low capacity. This ability to modulate allows the use of a single HVAC system that may be used for both high output for the time periods that the engine is operating, and low output during the time periods when the engine is turned off so as to continue to cool or heat the driving and/or sleeping compartments. The coordination of this modulation is provided by the HVAC component controller 50, which reduces the speed of the compressor when the engine is turned off. This modulation extends the duration of the heating and cooling operations because the charge of the available power sources is expended more slowly. That is, with a reduced speed of the compressor, the electric power demand is reduced as well.

Another aspect of FIG. 1 is a heating mode of operation in which there is an air heater in each air duct that leads to the vehicle compartments. For example, the air heater 270 is disposed in the air duct 272 which leads to the driving compartment 23. The air heater 274 is disposed in the air duct 276 which leads to the sleeping compartment 27. The air heaters 270 and 274 may be any heater known in the art, such as an electric resistance-type heater. The advantage of using an electric resistance-type heater is that such a heater allows the heating function to be completed without relying on the engine or additional fuel by merely relying on the circulation blowers and the heaters, which are powered by the first and/or second power sources or the vehicle electrical power generation system. In a preferred embodiment, instead of the air ducts 272 and 276, the air heaters 270 and 274 may be placed within the same enclosures as the circulation blowers 210 and 212 but still in the path of the gas stream which enters the vehicle and/or sleeping compartments. If the air heaters are in the same enclosures as the circulation blowers, there may be a reduction in the complexity of the installation.

To operate in the heating mode, the HVAC component controller 50 does not operate the compressor 14 but merely operates the circulation blower 210 and the air heater 270 to provide the necessary heating to the driving compartment and/or the circulation blower 212 and the air heater 274 to provide the necessary heating to the sleeping compartment. This configuration provides additional power consumption savings and allows for a longer operating duration in the heating mode. In the cooling mode of operation, the air heaters 270 and 274 are simply not activated. If temperature control is desired, the HVAC component controller 50 may preferably provide pulse width modulation control (PWM) of power to the air heaters 270 and 274. Alternatively, temperature control may be performed by a control door known in the art (not shown) placed in each duct (if provided) to control the flow of air (which may or may not be cooled by the evaporators 22 and/or 26) passing over the air heaters 270 and/or 274 to regulate the temperature of the air flowing into their respective vehicle compartments.

The embodiment of FIG. 1 may include alternative configurations. For example, the first or second cooling path may be eliminated such that there is only one expansion device, one evaporator, one blower, and no accumulator 30. With this configuration only one vehicle compartment may be temperature controlled. Alternatively, ducting may be used to channel the temperature controlled air into separate channels in which a first channel goes to the driving compartment and a second channel goes to the sleeping compartment. In this embodiment, a control door or the like may be used to channel the temperature controlled air to one compartment to the exclusion of the other.

Figure 2:
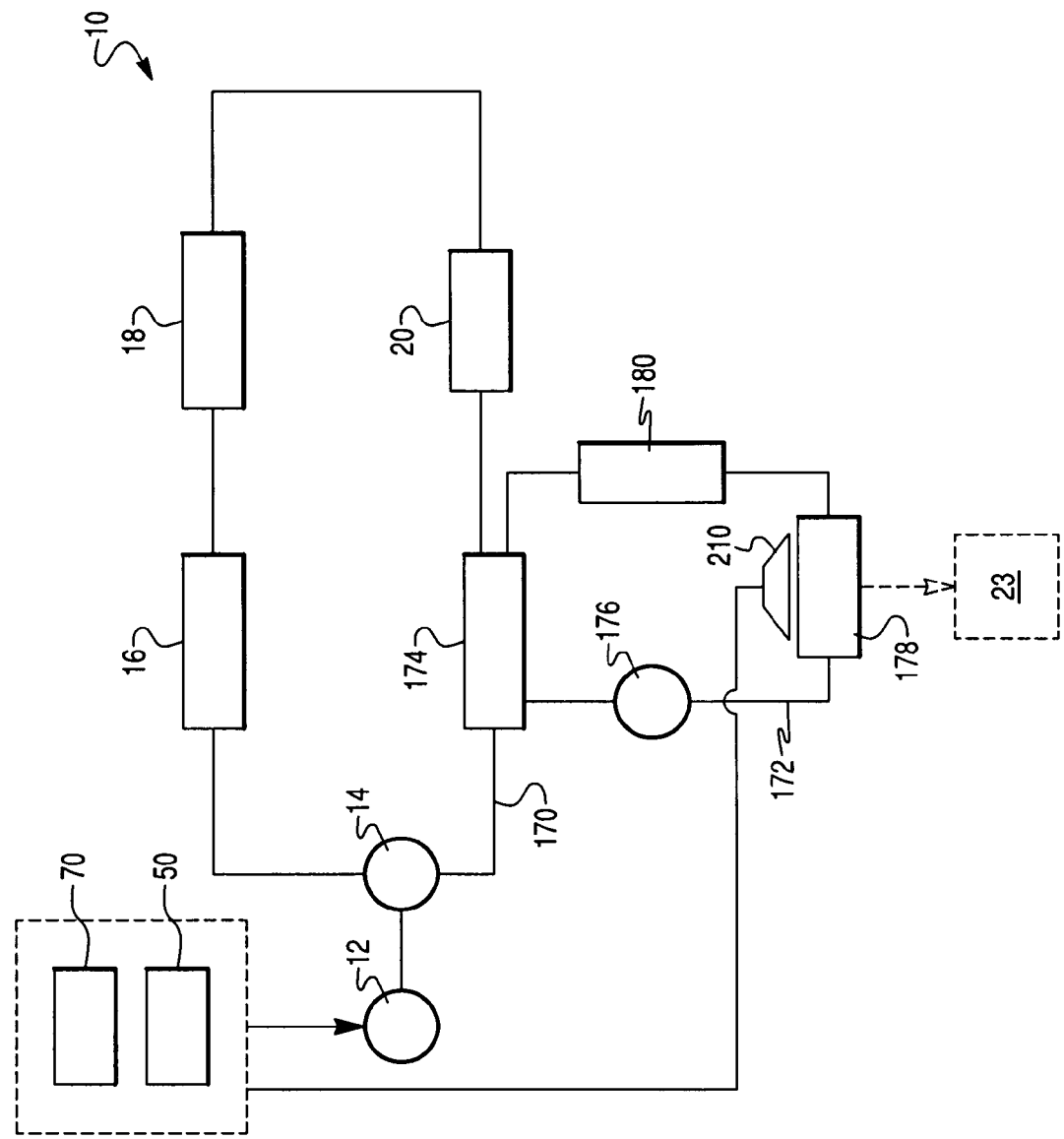
FIG. 2 is a schematic diagram of an HVAC system according to another exemplary embodiment.

FIG. 2 is a schematic diagram of another embodiment of the HVAC system 10 according to another embodiment of the present invention. The HVAC system 10 of this embodiment includes a primary coolant loop 170 that includes a first refrigerant and a secondary coolant loop 172 that includes a second refrigerant. The first refrigerant in the primary coolant loop 170 is driven by the compressor 14 which passes through the condenser 16, the receiver and dryer 18, the refrigerant metering device 20, the first refrigerant-to-second refrigerant heat exchanger 174, and back to the compressor 14.

In contrast, the second refrigerant in the secondary coolant loop 172 is driven by a low pressure liquid pump 176. The fluid passes through a second refrigerant-to-air heat exchanger 178, a heater 180, and the first refrigerant-to-second refrigerant heat exchanger 174. The first refrigerant-to-second refrigerant heat exchanger 174 serves as the heat exchange medium between the primary coolant loop 170 and the secondary coolant loop 172. The second refrigerant-to-air heat exchanger 178 cools the air supplied by the circulation blower 210, which then flows to the vehicle compartment with or without ducting. To provide heating of the vehicle compartment, the HVAC component controller 50 need only operate the low pressure liquid pump 176 and the heater 180 in the secondary coolant loop 172 and the circulation blower 210. That is, no power is delivered to the compressor 14, and as a result the amount of power consumption is further reduced, which extends the time duration that heating may take place.

Figure 3:
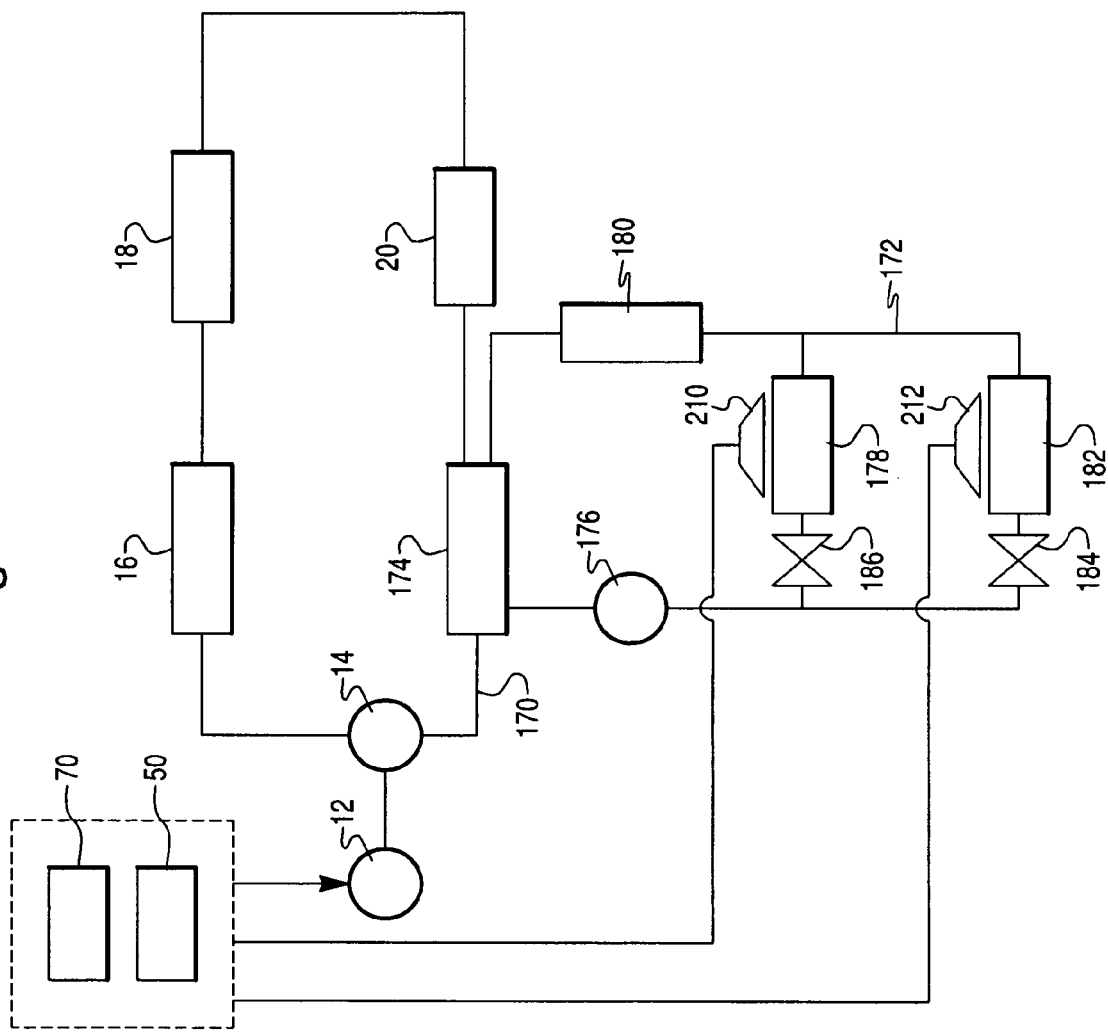
FIG. 3 is a schematic diagram of an alternative configuration of the HVAC system of FIG. 2.

FIG. 3 shows an alternative configuration of FIG. 2 in which there are two second refrigerant-to-air heat exchangers 178 and 182 in the secondary coolant loop 172. One second refrigerant-to-air heat exchanger 178 may be used to provide cooling/heating to the driving compartment 23 while the other heat exchanger 180 may be used to provide cooling/heating to the sleeping compartment 27 with or without ducting. The passage of the liquid through either or both of the heat exchangers 178 and 182 may be selected by the HVAC component controller 50, which, in turn, controls the valve 184 that leads to the heat exchanger 180 and the valve 186 that leads to the heat exchanger 178. Thus, the control of the valves 184 and 186 permits the driving compartment 23, the sleeping compartment 25, or both compartments to be air conditioned or heated at a particular time.

Figure 4:
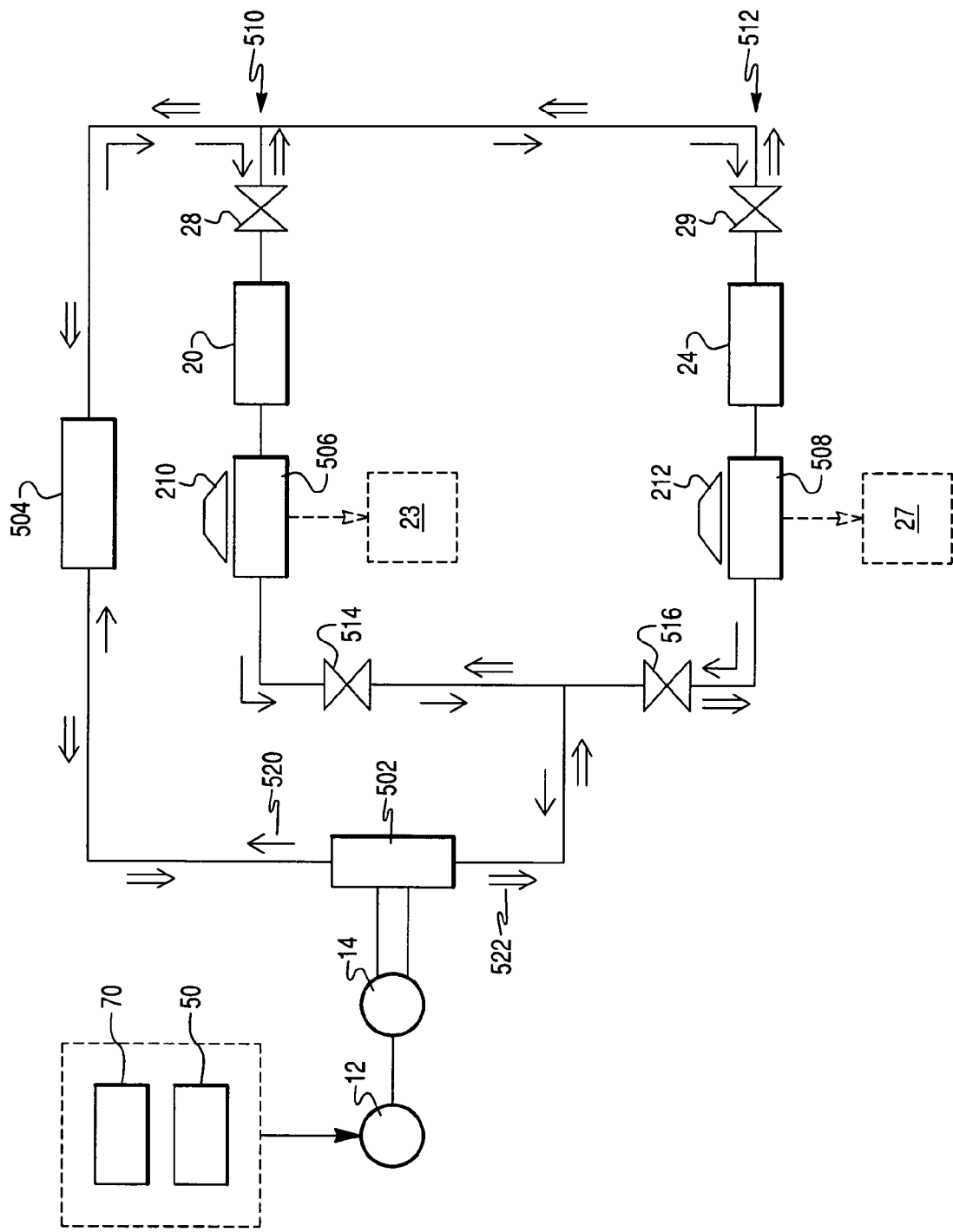
FIG. 4 is a schematic diagram of an HVAC system according to another exemplary embodiment.

FIG. 4 shows another embodiment of the present invention in which the HVAC system uses a reverse cycle heating system. The reverse cycle heating system also allows the heating function to be completed without relying on the engine or additional fuel by merely relying on the compressor and the circulation blowers, which are powered by the first and/or second power sources or the vehicle electrical power generation system. As with the embodiment shown in FIG. 1, the HVAC system 10 of FIG. 4 may comprise a motor 12, a compressor 14, circulation blowers 210 and 212, an HVAC component controller 50, and a power system 70. The motor may be a brushless DC or a synchronous permanent magnet motor, which is operatively coupled to the compressor 14. The compressor 14 is a continuously variable speed compressor, which is driven by the motor 12. Connected to the compressor is a reversing valve 502, which allows the compressor to pump refrigerant in a cooling direction indicated by single arrows 520 or a heating direction indicated by double arrows 522.

As to the cooling direction, the compressor 14 circulates refrigerant through a heat exchanger 504 (which functions as a condenser in the cooling mode as the hot compressed gas from the compressor condenses to a liquid as heat is given off) to a first flow path 510 that thermally treats air going to the driving compartment 23 and/or a second flow path 512 that thermally treats air going to the sleeping compartment 27 of the vehicle. As to the first flow path 510, the refrigerant passes through a refrigerant metering device 20 and a heat exchanger 506 (which functions as an evaporator in the cooling mode as the liquid refrigerant boils and forms a gas as heat is absorbed by the refrigerant liquid). Air is blown over the heat exchanger 506 by the circulation blower 210. After the air is cooled by the heat exchanger 506, the air proceeds towards the driving compartment 23 of the vehicle.

A second flow path 512 runs parallel to the first flow path 510 in which the refrigerant is provided through a refrigerant metering device 24 and a heat exchanger 508 (which functions as an evaporator during the cooling mode as the liquid refrigerant boils and forms a gas as heat is absorbed by the refrigerant liquid). Air is blown over the heat exchanger 508 by a circulation blower 212. After the air is cooled by the heat exchanger 508, the air proceeds towards the sleeping compartment 27 of the vehicle. The heat exchanger 508 of the second flow path 512 may be smaller than the heat exchanger 506 of the first flow path 510 because the sleeping compartment 27 is typically smaller than the driving compartment 23.

The two coolant loops may be selectable through the use of valves 28, 29, 514, and 516. The inclusion of such valves permits the driving compartment 23, the sleeping compartment 25, or both compartments to be air conditioned at a particular time. The valves 28 and 514 are opened and the valves 29 and 516 are closed when only the driving compartment is being temperature controlled. By a similar token the valves 29 and 516 are opened and the valves 28 and 514 are closed when only the sleeping compartment is being temperature controlled. The valves 28, 29, 514, and 516 may be controlled through the HVAC component controller 50. Once the refrigerant passes through the heat exchanger 506 and/or 508, the refrigerant then returns to the reversing valve 502 and the compressor 14 to restart the process.

As to the heating direction, the reversing valve 502 is switched such that the refrigerant pumped by the compressor flows in the reverse direction as indicated by double arrows 522. Thus, the compressor causes the refrigerant to flow through the first flow path 510 and/or the second flow path 512 depending if the valves 28 and 514 and the valves 29 and 516 are opened or closed. If the valves 28 and 514 are opened, the refrigerant flows through the heat exchanger 506 (which functions as a condenser in the heating mode as the hot gas is condensed to a liquid as it gives up heat). Air is blown over the heat exchanger 506 by the circulation blower 210. After the air is heated by the heat exchanger 506, the air proceeds towards the driving compartment 23 of the vehicle. Meanwhile, the refrigerant continues from the heat exchanger 506 through the refrigerant metering device 20 to the heat exchanger 504 (which functions as an evaporator in the heating mode). After flowing through the heat exchanger 504, the refrigerant returns to the reversing valve 502 and the compressor 14.

If the valves 29 and 516 are opened, the refrigerant flows through the heat exchanger 508 (which functions as a condenser in the heating mode). Air is blown over the heat exchanger 508 by a circulation blower 212. After the air is heated by the heat exchanger 508, the air proceeds towards the sleeping compartment 27 of the vehicle. Meanwhile, the refrigerant continues from the heat exchanger 506 through the refrigerant metering device 24 to the heat exchanger 504 (which functions as an evaporator in the heating mode). After flowing through the heat exchanger 504, the refrigerant returns to the reversing valve 502 and the compressor 14 to restart the process.

Similar to the embodiment shown in FIG. 1, the embodiment of FIG. 4 may include a variable speed compressor 14 driven by a brushless DC or a synchronous permanent magnet motor 12; the control for the heating and cooling operations being provided by the HVAC component controller 50. The available power sources may come from the power system 70, which may include a first power source 40, a second power source 42, and/or the vehicle's main electrical power generation system 44 as seen in FIG. 5. The circulation blowers 210 and 212 may also have continuously variable speed which may be controlled by the HVAC component controller 50; and the battery management controller 60 of the power system 70 may monitor and control the available power sources when the engine is turned off.

Also as with the embodiment of FIG. 1, FIG. 4 may include alternative configurations. For example, the first or the second cooling path may be eliminated such that there is only one refrigerant metering device, one heat exchanger in which air passes over, and one blower. With this configuration only one vehicle compartment may be temperature controlled. Alternatively, ducting may be used in which the duct channeling the temperature controlled air may be spit into multiple channels such that a first channel goes to the driving compartment and a second channel goes to the sleeping compartment. In this embodiment, a control door or the like may be used to channel the temperature controlled air to one compartment to the exclusion of the other.

The power requirements and operation of the HVAC system 10 are handled by the battery management controller 60 of the power system 70 and the HVAC component controller 50, respectively. The two controllers 50 and 60 may be software control loops with associated hardware or circuitry, and they may be physically housed in separate devices or the same device.

The power system 70 with the battery management controller 60 will now be discussed with reference to FIG. 5. The power system 70 may comprise a first power source or battery 40, a second power source or battery 42, an electrical power generator 76 in an electrical generation system 44, an electrical load 78; a first regulator or converter 72, a second regulator 73, a third regulator 74, a user interface 51, and a battery management controller 60. The first regulator or converter 72, the second regulator 73, the third regulator 74, and the battery management controller 60 may constitute a power management module. The power management module may also include the user interface 51, temperature and voltage sensors 63, sensors for monitoring current flow to and from the first and second power sources, and/or the HVAC component controller 50. The components of the power management module may be or may not be contained within a single housing.

In one exemplary embodiment, a truck may have seven batteries in which four batteries are connected in parallel to provide a high capacity first battery bank as the first power source 40 and the three remaining batteries are connected in parallel to provide a second, somewhat smaller battery bank as the second power source 42. For the following discussion, the first power source 40 will be called the first battery (which may be a single battery or a plurality of batteries in a battery bank) and the second power source 42 will be called the second battery (which may be a single battery or a plurality of batteries in a battery bank). The first battery 40 can have a first battery voltage and the second battery 42 may have a second battery voltage that is different from the first battery voltage.

The first battery 40 and/or the second battery 42 may be connected to the first regulator 72, the second regulator 73, and temperature and voltage sensors 63. Also, one of the first and second batteries is also connected to the vehicle starting system to provide power to start the engine of the vehicle, for example, by being connected to the engine starter 64. In the embodiment of FIG. 5, the first battery 40 may be, for example, one or more starter batteries which are used to start up the vehicle upon ignition. Accordingly, the first battery 40 may be connected to the engine starter 64. According to one embodiment of the present invention, the first battery may be a lower quality battery than the second battery such that it may not be desirable to discharge the first battery to more than 20-30%. Alternatively or additionally, the first battery may be a secondary or auxiliary battery while the second battery may be the main battery of the vehicle. The second (main) battery can be connected to the first (secondary battery) for supplying current to the electrical load 78.

The temperature and voltage sensors 63 may monitor the voltage and temperatures of the first and second batteries 40 and 42. Additionally or alternatively, sensors for monitoring the current flow to and from the first and second batteries may be used. These sensors may be used to monitor the state of charge of the batteries so as to prevent the batteries from being overly discharged.

The engine starter 64 is connected to one of the batteries so as to provide enough power to start the engine of the vehicle. The engine starter 64 may be electrically directly connected to the first battery, directly connected to the second battery, and/or directly connected to one of the first and second batteries while the other of the first and second batteries is connected to the engine starter through the second regulator or converter 73. In FIG. 5, the engine starter 64, for example, is directly connected to the first battery 40 and is indirectly connected to the second battery 42 via the first battery 40 and the second regulator 73.

The electrical power generation system 44 comprises an electrical power generator 76 configured to charge the first battery 40, the second battery 42, and/or run the electrical load 78. Although the embodiment of FIG. 5 shows that the electrical power generator 76 is not directly connected to the load 78, it is contemplated that the generator 76 may be directly connected to the load 78. In one embodiment, the electrical power generator 76 is an alternator, such as a truck alternator, configured to be driven by the engine of the vehicle. The alternator may be configured such that, when the engine is on and running idle, the HVAC system should be able to run at maximum speed and load while the alternator provides maximum charging capacity for the batteries at the same time. For example, the alternator may be rated for 250 A, 24 V or 500 A, 12 V. In such an embodiment, the battery management controller 60 is configured to control the excitation of the alternator to control the alternator output voltage.

The first regulator 72 may be a current regulator, which is connected to the electrical power generator 76 and to at least one of the first and second batteries 40 and 42. The battery management controller 60 controls the current regulator 72 so as to regulate the amount of current flowing from the generator 76 to the at least one of the first and second batteries 40 and 42. According to the embodiment of FIG. 5, the first regulator 72 is connected to both the first and second batteries 40 and 42, and thus may be controlled by the battery management controller 60 to regulate the amount of current flowing from the generator 76 to both the first and second batteries. In other words, the first regulator 72 may charge up the first battery 40, charge up the second battery 42, and/or run the components of the HVAC system 10 based on commands from the battery management controller 60. The first regulator 72 may be a DC-to-DC converter, such as a buck DC regulator or a buck/boost DC regulator and selector.

The second regulator 73 may connect the first and second batteries 40 and 42 together to control the current flow between the first and second batteries. The regulator 73 may be a DC-to-DC converter, such as a buck/boost DC regulator and selector. The second regulator 73 may be a converter that is controlled by the battery management controller 60 to operate in a neutral mode, a first battery charging mode, or a second battery charging mode. In the first and second battery charging modes, the second regulator or converter 73 is configured to create a voltage difference between the first and second batteries. For example, in the first battery charging mode, the second regulator 73 is configured to adjust a voltage difference between the first and second batteries so as to cause current to flow from the second battery to the first battery to thereby charge the first battery, regardless of the respective charges of the two batteries. That is, current can flow from the second battery to the first battery even if the first battery may have a charge that is greater than, equal to, or less than the charge of the second battery. Thus, the battery management controller 60 coupled to the first and second batteries (for example, secondary and main batteries, respectively) is configured to adjust the system so that the first (secondary) battery is charged by the second (main) battery when a state of charge of the first (secondary) battery is below a predetermined threshold even when a state of charge of the second (main) battery is less than the state of charge of the first (secondary) battery.

In the second battery charging mode, the second regulator 73 is configured to adjust the voltage difference between the first battery and the second battery so as to cause current to flow from the first battery to the second battery to thereby charge the second battery, regardless of the respective charges of the two batteries. That is, current can flow from the first battery to the second battery even if the second battery may have a charge that is greater than, equal to, or less than the charge of the first battery. Thus, the battery management controller 60 coupled to the first and second batteries (for example, secondary and main batteries, respectively) is configured to adjust the system so that the second (main) battery is charged by the first (secondary) battery when a state of charge of the second (main) battery is below a predetermined threshold even when a state of charge of the first (secondary) battery is less than the state of charge of the second (main) battery.

In the neutral mode, the second regulator 73 is configured so that no current flows between the first and second batteries. For example, the battery management controller 60 may be configured to operate the second regulator 73 in the neutral mode so as to break the connection between the first and second batteries to prevent current from flowing between the two. Alternatively, the battery management controller 60 may be configured to operate the second regulator 73 in the neutral mode so as to adjust the voltage difference between the first and second batteries to prevent current from flowing between the first and second batteries.

The third regulator 74 may be a boost DC regulator connected to at least one of the first and second batteries 40 and 42 and to the load 78 (for example, one or more components of the HVAC system 10). The boost converter raises the voltage being supplied to the load by the at least one of the first and second batteries 40 and 42. In the embodiment of FIG. 5, the boost converter 74 is connected between the second battery 42 and the load 78. Thus, the boost converter of FIG. 5 raises the voltage being supplied to the load by the second battery 42.

The electrical load 78 may be powered by at least one of the first battery 40, the second battery 42, and/or the electrical generator 76. The load 78 may be components of the HVAC system 10 for either heating or cooling the compartment of the vehicle and/or other electrical power accessories, such as microwave ovens, televisions, stereos, refrigerators, etc.

The battery management controller 60 provides the following functions: (1) to monitor the first voltage of the first battery 40 and the second voltage of the second battery 42 and/or to monitor current flow to and from the first and second batteries 40 and 42; (2) to control the operation of the second regulator or converter 73 to operate in either the neutral mode, the first battery charging mode or the second battery charging mode; (3) to control the first or current regulator 72 and the second regulator or converter to adjust the relative charging rates of the first and second batteries; (4) to control the third regulator or boost converter 74 to adjust the power being supplied to the load 78 from the at least one of the first and second batteries 40 and 42; (5) to control the power system 70 to conduct an equalization charge of one of the first (secondary) battery and the second (main) battery using the other of the first and second batteries; (6) to control the electrical generator to raise an output voltage to an increased value greater than a normal output voltage in order to conduct an equalization charge on one of the first (secondary) battery and the second (main) battery; and/or (7) to control the first or current regulator 72 so as to increase the amount of current flowing from the generator to the one of the first (secondary) battery and the second (main) battery.

The battery management controller 60 may also fulfill a variety of other different purposes including: (1) maximizing the electrical power available for use by the HVAC system; (2) ensuring that sufficient electrical reserve power is available to start the engine; (3) tracking historical use (charge and discharge) of all connected batteries; (4) determining the current state of charge of all connected batteries; (5) determining the current end-of life status of all connected batteries irrespective of their respective charge level; (6) ensuring that the charge and discharge cycles of all connected batteries are consistent with the user's preferred compromise between battery longevity and available stored energy; and (7) preventing the overloading of the battery charging system.

The battery management controller 60 may comprise a control logic circuit 66 and a memory 67. The battery management controller 60 carries out its function by being connected to the voltage and temperature sensors 63, the first regulator 72, the second regulator 73, the third regulator 74, the electrical power generation system 44, a user interface 51 (which may comprise a display 310 and one or more input devices 312), and the HVAC component controller 50.

The memory 67 of the battery management controller may be any suitable storage medium, such as a ROM, a RAM, an EEPROM, etc. The memory 67 is used to store a plurality of data to be utilized by the battery management controller 60 when controlling the components of the power system 70. For example, the memory 67 may be used to log historical data obtained during previous charge and discharge cycles, such as voltage and temperature levels, and use the historical data to modify the permitted depth of discharge to ensure the completeness of future charge cycles. For example, to ensure that the batteries are fully recharged between cycles to prevent premature sulfation and destruction of the batteries, the battery management controller may monitor and store the time and power levels of the batteries during the discharge and recharge cycles. This historical data may verify that, in a typical discharge and re-charge cycle, sufficient time and power is available to fully recharge the batteries. If there is not sufficient time and power to fully recharge, the control logic circuit 66 may respond by raising the minimum battery cut-off voltages thereby reducing the total amount of power which may be drawn from the batteries. In other words, the battery management controller 60 may be configured to be self-learning which allows the controller to maximize the battery replacement life by monitoring the first and/or second power sources such that they are not excessively discharged (i.e., drained) and such that they are not discharged to a level that does not allow the power source to be fully recharged during the typical engine run time. For example, consider that a power source might be a battery in which the battery may be safely discharged to a level X. Thus, the level X may be the predetermined amount value during the determination of whether the power source should be connected to the HVAC system. However, if the run cycle of the engine was too short to allow the battery to fully recharge during the engine run after the battery had been partially discharged, the battery would still be prematurely destroyed because failure to fully recharge a battery is just as harmful as discharging it too deeply (or draining the charge too much). To prevent the premature destruction of a battery due to it not being fully recharged, the battery management controller 60 may monitor the battery charge in the power source to determine if the battery was fully recharged. If the battery was not, then the controller 50 may be configured to "learn" during the next operation where the power source is connected and the engine is turned off such that the battery should be less deeply discharged, i.e., the battery should be discharged to a level Y, which is greater than the level X. Then, the level Y may be the predetermined amount value during the determination of whether the power source should be connected to the HVAC system. In more simplified terms, if a battery (such as the first battery 40 or the second battery 42) can only be recharged at a certain charge rate and if a user has a tendency to run the engine of the vehicle for an amount of time shorter than is necessary to fully charge the battery when it is discharged to a certain level, this information is used by the battery management controller 60 to modify the allowed amount that the battery can be discharged. Thus, with the modified level of allowed discharge, the battery will be more likely to be fully charged after the engine has been run for that user's typical amount of time.

The memory 67 can also store data that is useful in determining the current state of charge of the batteries. For example, in a more conventional HVAC system, the measurement of the battery voltage under load is used to determine the state of charge. While this method is low in cost and easy to implement, it is also highly inaccurate. The voltage may be used to accurately determine the state of charge but only when such measurements are taken in conjunction with temperature and only after the battery has been "at rest" (i.e., unloaded) for a period or time (typically over one hour). However, the battery management controller 60 of FIG. 5 may use multiple sources of historical data (stored in the memory 67) and real-time data to more accurately determine the current amount of stored energy available for use. Additionally, the battery management controller 60 allows highly accurate "resting voltage" measurements of the state of charge to be made of the power reserve and to be stored even when portions of the battery power supply are still in use.

The control circuitry 66 of the battery management controller 60 may comprise the necessary hardware, software, or other mechanisms necessary to carry out the functions to which it was designed.

The user interface 51 may include a display 310 and input devices 312. The display 310 of the user interface 51 may provide a user, such as a vehicle occupant, information related to the status of the HVAC system 10 and/or the power system 70. The display may include one or more of an alphanumerical display, a graph, or the like. For example, the display may include the vehicle's interior ambient temperature, the exterior ambient temperature, the circulation blower speeds, the usage of the power source or sources supplied to the HVAC system 10, and warning messages, etc. In one example, if the first power source and the second power source are batteries, the display may show the current approximate battery charges for each power source to the vehicle occupant.

One or more input devices 312 may also be a part of the user interface. The input devices may be one or more of a keyboard, a control panel, or the like, so that the vehicle occupant may input user preferences for the operation of the HVAC system 10 and the power system 70. For example, the user preferences may include the operating mode of the HVAC system such as off, heating, and cooling modes of operation. Also, the input device 312 of the user interface may allow a user, such as a vehicle occupant, to select the operating mode of the second regulator or converter 73, for example, the neutral mode, the first battery charging mode, or the second battery charging mode.

Below is a discussion of the processes that occur during the accessory run mode when the batteries are discharging when the engine is turned off, the engine start-up mode, and recharge mode when the batteries are being recharged when the engine is turned on.

Figure 6A:
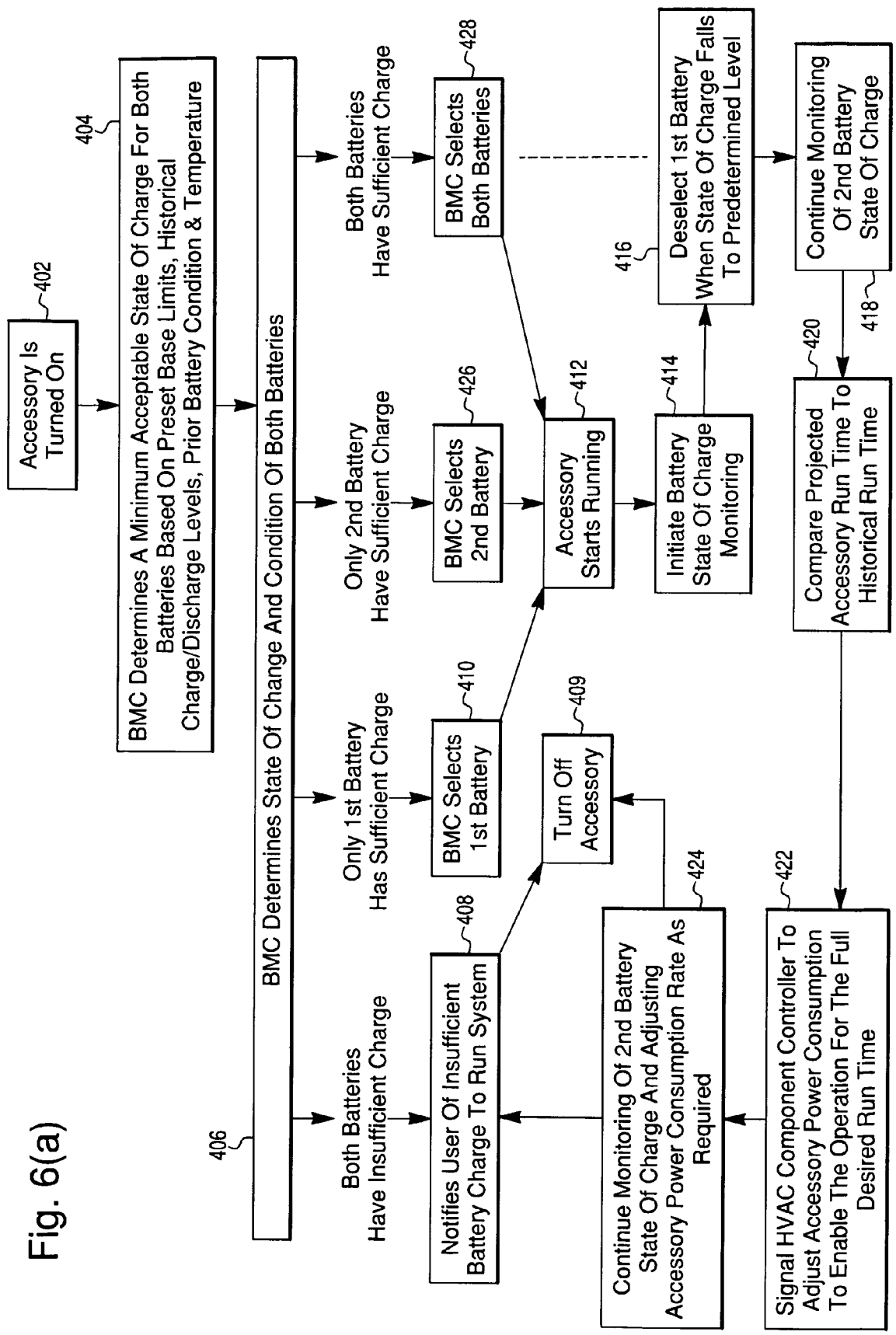
FIG. 6(*a*) is flow chart showing the operation of the power system during an accessory run mode.

The process that the power system including the battery management controller undergoes during an accessory run (discharging) mode is provided in FIG. 6(a). The discharging of the first and/or second batteries occurs when the engine is turned off and an accessory or a plurality of accessories is turned on as shown in step 402. Although the foregoing discussion talks of only one accessory being powered, it is understood the same discussion applies to when a plurality of accessories are being powered. According to one example the accessory may be the HVAC system 10 for heating or cooling the compartment of the vehicle. The battery management controller 60 ("BMC") determines a minimum acceptable state of charge for both batteries based on preset base limits, historical charge/discharge levels, priority battery conditions, user inputs, and temperature as shown in step 404. In step 406, the battery management controller 60 through its control circuit 66 determines the state of charge and condition of the first and second batteries by using the current voltage and temperature of the batteries from data received by the voltage and temperature sensors 63 and optionally the historical data stored in the memory 67 of the controller 60. The battery management controller then determines if the first battery has sufficient charge and if the second battery has sufficient charge.

If neither battery has sufficient charge, the process proceeds to step 408 in which the user is notified that there is insufficient battery charge to run the accessory. The accessory is turned off, and the process ends at step 409.

If only the first battery has sufficient charge, the process proceeds to step 410 in which the battery management controller 60 selects the first battery 40 as a power source and the accessory is operated at step 412. The current from the first battery 40 runs through the second battery 42 as it travels from the first battery 40 through the third regulator 74 to the load 78. As the accessory is running, the state of charge for the first battery is monitored by the controller 60 at step 414, and if the state of charge of the first battery falls below a predetermined level, the first battery is deselected at step 416.

At step 418, the second battery is monitored to determine if it has sufficient state of charge to run the accessory. Although the second battery did not have sufficient charge in step 406, the charge of the second battery may have replenished after sitting around for a while. In the event that the second battery replenishes sufficiently to be used as a power source for the accessory, the second battery can be used to power the accessory.

At step 420, there is a comparison between the projected accessory run time (based on state of charge of the second battery and/or user input) and the historical run time. For example, the power draw (current) from the HVAC system 10 is monitored and the rate of decline in the battery is noted. The power draw and rate of decline is compared to historical data to determine the approximate state of sulfation of the battery plates and from this comparison, the approximate condition of the battery is deduced. Under a given load, the voltage of batteries in poor condition will decline faster than batteries in good condition. Consequently, it may be predicted that batteries in poor condition will have less total stored energy even though the actual voltage at any given time may be the same. In one example, data may be collected related to the maximum battery discharge and/or the average battery discharge during an operation cycle of the batteries. This data may be compiled over time such that a history of the maximum and/or average battery discharge is stored in the memory 67 in the battery management controller 60.

As another example, user preferences which are inputted using the user interface 51 are also factors that influence the extent to which the batteries 40 and 42 will be allowed to be discharged. One example is the battery replacement life. Battery replacement life is related to the depth of the discharge of the power source as well as the rate of discharge, i.e., a function of the minimum battery voltage adjusted by the load. For example, a lightly loaded battery which is consistently discharged to 11.8 V may only last through 100 charge/recharge cycles while a heavily loaded battery that was consistently discharged to 11.8 V might last 200 charge/recharge cycles. If a user preference is set for a long battery life, the batteries will be less deeply discharged and will last longer. However, because less stored energy will be available for use, more batteries will need to be carried to supply a given amount of cooling or heating than would be the case if a shorter battery life (and more deeply discharged batteries) were selected.

Based on the comparison of the projected accessory run time and the historical run time, the battery management controller 60 will send a signal to the HVAC component controller 50 so as to adjust the running of these components so as to enable the operation of these components for the full desired amount of time, as shown in step 422. As the voltage of the second battery is being discharged, in step 424, the battery management controller will continue to monitor the state of charge of the second battery, and send signals to the HVAC component controller so as to adjust the running of the accessories based on the current state of charge.

With continued operation of the HVAC system 10, the voltage of the first battery 40 continues to decline. The battery management controller logic circuit re-analyzes the battery 40 by comparing real time data on the power draw, the temperature and the rate of voltage decline with the stored historical data and the user input preferences to determine the amount of stored energy available.

A determination is made of the minimum system disconnect voltage, i.e., the battery cut-out voltage. From this determination, a calculation is made of the estimated time to battery depletion for the first battery and this estimated time information is communicated to the HVAC component controller 50. Because the estimated time information is based on both static data (such as historical and user input) and real-time data (such as current voltage levels and temperatures), a change in the performance, the system load or the ambient conditions during the operation of the HVAC system 10 may change the estimated time information which may increase or decrease the calculation of the available system run time. As long as there is sufficient voltage, the battery management controller will continue to have the second battery power the accessory and monitor the second battery's voltage level (and/or the current flow to and from the battery). However, the power may eventually be depleted from the second battery 42 to the point where the voltage falls to the level calculated by the control logic circuit to be the minimum allowed, i.e., the battery cut-out voltage, and disconnect the second battery 40. Once the state of charge of the second battery falls below the minimum allowed level, the process proceeds to steps 408 and 409 in which the user is notified via the user interface of the insufficient battery charged to run the accessory and the accessory is turned off.

Referring back to step 406, if only the second battery is determined to have sufficient charge to run the accessory, the process proceeds to step 426 in which the accessory starts running while only using the second battery as the power source. As the accessory is running, the state of charge for the second battery is monitored by the controller 60 at step 414. Step 416 does not really take place because the first battery was never selected as the power source for the accessory so there is no need to deselect it. Thus, from step 414, the process may then proceed to step 418. At step 418, the second battery is monitored to determine if it has sufficient state of charge to run the accessory.

At step 420, there is a comparison between the projected accessory run time (based on the state of charge of the second battery and/or user input) and the historical run time, as previously described. Based on the comparison of the projected accessory run time and the historical run time, the battery management controller 60 will send a signal to the HVAC component controller 50 so as to adjust the running of these components so as to enable the operation of these components for the full desired amount of time, as shown in step 422. In step 424, the battery management controller will continue to monitor the state of charge of the second battery, and send signals to the HVAC component controller to adjust the running of the accessories based on the current state of charge. Once the state of charge of the second battery falls below a predetermined level, the process proceeds to steps 408 and 409 in which the user is notified via the user interface of the insufficient battery charged to run the accessory and the accessory is turned off.

Referring back to step 406, if both the first and second batteries are determined to have sufficient charge to run the accessory, the process proceeds to step 428 in which the accessory started running while both batteries are used as the power source. As the accessory is running, the state of charge for each battery is monitored by the controller 60 at step 414. As the accessory is running, the state of charge for the first battery is monitored by the controller 60 at step 414, and if the state of charge of the first battery falls below a predetermined level, the first battery is deselected at step 416. At step 418, the second battery is monitored to determine if it has sufficient state of charge to run the accessory.

At step 420, there is a comparison between the projected accessory run time (based on state of charge of the second battery and/or user input) and the historical run time, as previously described. Based on the comparison of the projected accessory run time and the historical run time, the battery management controller 60 will send a signal to the HVAC component controller 50 so as to adjust the running of these components so as to enable the operation of these components for the full desired amount of time, as shown in step 422. In step 424, the battery management controller will continue to monitor the state of charge of the second battery, and send signals to the HVAC component controller to adjust the running of the accessories based on the current state of charge. Once the state of charge of the second battery falls below a predetermined level, the process proceeds to steps 408 and 409 in which the user is notified via the user interface of the insufficient battery charged to run the accessory and the accessory is turned off.

Figure 6B:
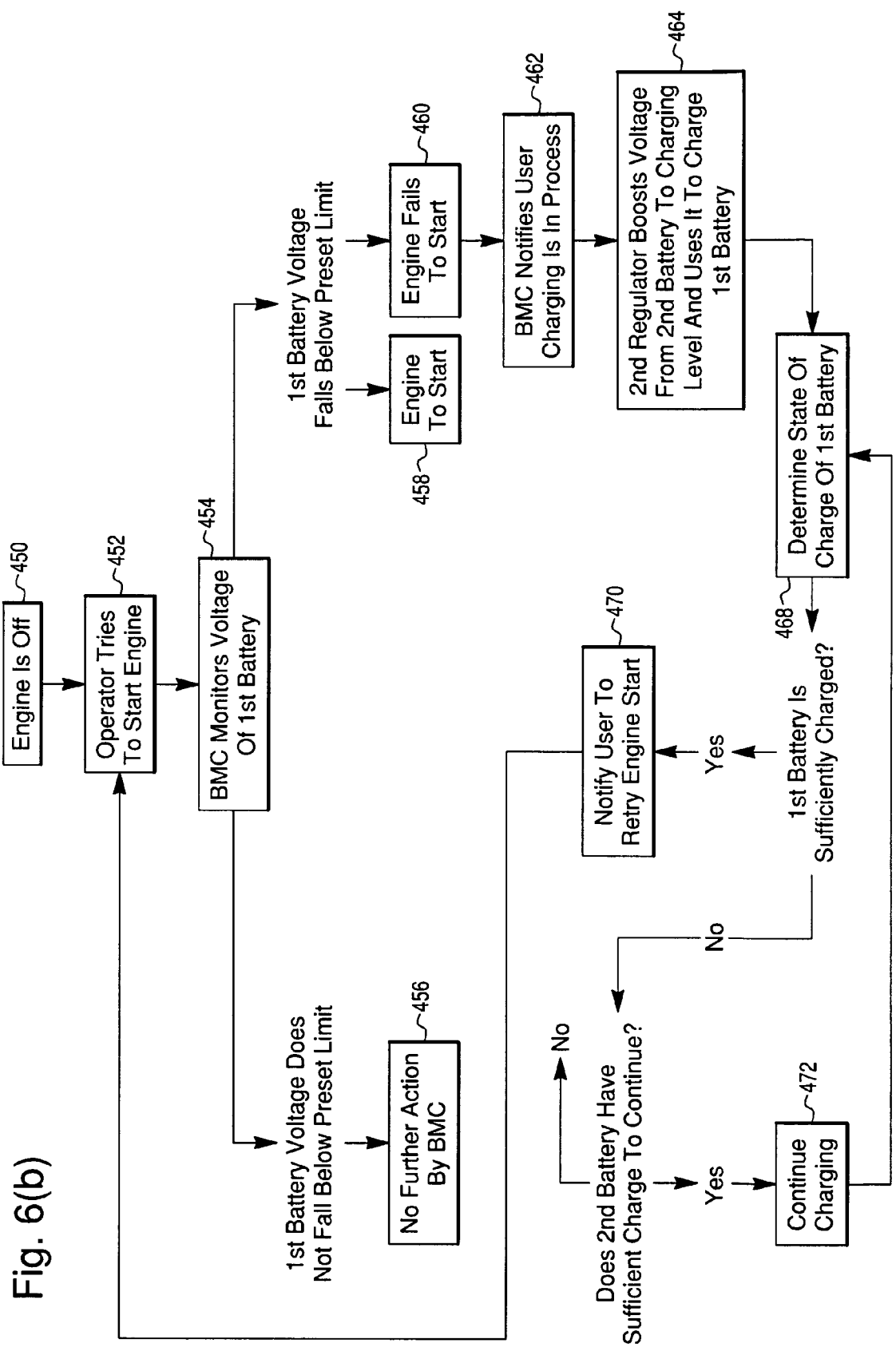

The process that the power system including the battery management controller undergoes during an engine start mode is provided in FIG. 6(*b*). Initially, the engine is turned off as shown in step 450. An operator tries to start the engine at step 452. At the start up of the engine, a heavy electrical load is applied to the first battery 40 causing the voltage of the first battery 40 to drop. The amount of drop depends on the condition, the state of charge, and the temperature of the first battery 40 as well as the engine itself. Thus, there is a chance that under certain adverse conditions, the voltage drop will be so severe as to prevent the engine from starting unless additional electrical power is made available. Alternatively or additionally, the discharge of the first battery may be at such a level that there is insufficient voltage for the engine starter. For example, the first battery may be already 80% discharged or even dead before applying the heavy electrical load. If the voltage or state of charge of the first battery is insufficient to start the engine, the battery management controller provides a "start assist" function in which the second battery is used to charge the first battery up to a level sufficient to start the engine.

At step 454, the battery management controller 60 monitors the voltage or state of charge of the first battery 40 (or the current flow to and from the battery) to determine if it falls below a preset limit, for example, a voltage level that would prevent the first battery 40 from starting the engine. If the voltage of the first battery 40 does not fall below the preset limit, no further action is needed to be taken by the battery management controller 60 in regard to starting the engine, as indicated in step 456, because there is sufficient voltage or charge in the battery to start the engine. Thus, the engine is started. If the voltage of the first battery 40 falls below the preset limit, but the engine starts anyway, as indicated in step 458, no further action needs to be taken by the battery management controller 60 in regard to starting the engine, as indicated in step 456. However, the battery management controller may command that the first battery be recharged, as will be discussed later.

If the voltage of the first battery 40 falls below the preset limit, and the engine fails to start, as indicated in step 460, the process proceeds to step 462 wherein the battery management controller 60 notifies the user that the charging of the first battery is in process. The user may be notified through the display 51 and/or through any other suitable audio, visual, or tactile indicator. At step 464, the battery management controller 60 then controls the second regulator or converter 73 to boost the voltage from the second battery 42 and use it to charge the first battery 40 (the first battery charging mode). This boosting is accomplished by the battery management controller adjusting a voltage difference between the connecting first and second batteries to cause current to flow from the second battery to the first battery to thereby charge the first battery. In a simplified example, each battery is connected to a DC-to-DC converter of the buck/boost type as a load/source. The determination of whether the first battery is a load (receiving current) or a source (sending current) depends upon the duty cycle of the switching transistor associated with it. Likewise, the determination of whether the second battery is a load (receiving current) or a source (sending current) depends upon the duty cycle of the switching transistor associated with it. The duty cycles of these switching transistor is determined and controlled by the battery management controller 60.

At step 468, the state of charge of the first battery 40 is monitored and determined by the battery management controller 60. If the first battery 40 has sufficient charge, the process proceeds to step 470 wherein the user is notified by the display 51 and/or any other suitable audio, visual, or tactile indicator to retry starting the engine. From step 470, the process proceeds back to step 452. If the first battery 40 does not have sufficient charge, the recharging of the first battery 40 with the voltage of the second battery 42 continues but the battery management controller 60 also monitors the voltage of the second battery 42 (or the current flow to and from the battery). If the second battery 42 has sufficient charge, the recharging continues as indicated in step 472 and the state of charge of the first battery 40 is monitored and determined by the battery management controller 60 as indicated in step 468.

If at any point, during the recharging, the battery management controller 60 determines that the second battery does not have sufficient charge to continue the recharging, the process proceeds to step 470 wherein the user is notified by the display 51 and/or any other suitable audio, visual, or tactile indicator to retry to start the engine. From step 470, the process proceeds back to step 452. Optionally, after a predetermined number of iterations, if the first battery does not gain sufficient charge to start the engine and the second battery does not have sufficient charge to recharge the first battery, the user can be notified by the display 51 and/or any other suitable audio, visual, or tactile indicator to cease attempting to start the engine.

To provide a more concrete example of the start assist function, if both the first and second batteries, for example, are each discharged 80% and neither battery alone is suitable to start the engine. The battery management system issues commands such that the last 20% charge left in the second battery 42 is channeled through the second regulator 73 into the first battery so as to charge up the first battery 40. Even though the charge of the first battery 40 will become greater than the charge of the second battery during the process of charging up the first battery, the charging up process will still continue until the first battery is charged up to a level so that the first battery can be used to start the engine. For example, the first battery 40 will continue to be charged if the first battery is charged to 25% while the second battery is depleted down to 15%. If the engine can start with a battery charged to 30%, the charging process will continue to this point, even though the second battery may be depleted down to 10%. In this example, the second battery is used only to charge the first battery. This charging process may be more advantageous than merely directly coupling the first and second batteries to each other and then directly connecting the coupled batteries to the starter. For instance, in an example where the first battery is depleted and the second battery is fully charged, if both batteries are connected to each other, the second battery may be uncontrollably drained by the first battery instead of being used to start the engine.

Figure 6C:
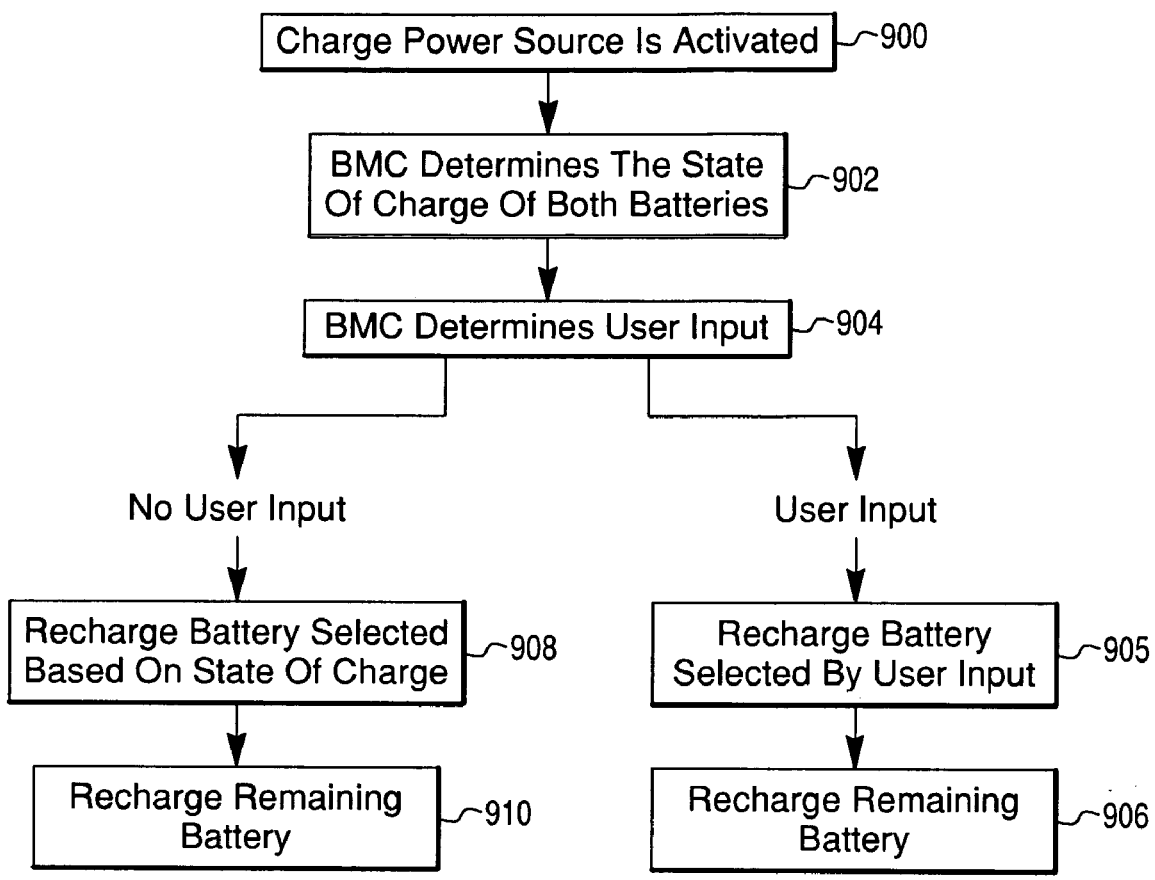

The process that the power system including the battery management controller undergoes during a recharging mode is provided in FIG. 6(c). Upon the start up of the engine, a charge power source, such as an electrical power generator 76 or alternator, is activated, as indicated in step 900. The battery management controller 60 determines, in step 902, the state of charge of the first and second batteries, and then proceeds to step 904.

At step 904, there is a determination of whether there has been any user input provided from the user interface 51. For example, the user interface may be configured to allow a vehicle occupant to select the operating mode of the second regulator or converter. For example, if the user selected the first battery to be charged first, the process proceeds to step 905 in which the battery management controller controls the first regulator 72 to regulate the amount of current flowing from the generator so that it charges the first battery before the second battery. Similarly, if the user selected the second battery to be charged first, the process proceeds to step 905 in which the battery management controller controls the first regulator 72 to regulate the amount of current flowing from the generator so that it charges the second battery before the first battery. However, as the selected battery charges up, a situation may occur in which the voltage of the selected battery being charged up by the power generator exceeds the voltage of the unselected battery. In such an instance, to prevent the current from flowing through the selected battery and into the unselected battery, the battery management controller 60 may control the second regulator 73 so that it is in a neutral mode to prevent any current from flowing between the two batteries or in a mode to ensure that only the selected battery is being charged.

Once the selected battery reaches a predetermined threshold such that it can be considered suitably charged, the process can proceed to step 906 in which the remaining battery is recharged. In this instance, the first regulator 72 may be controlled by the battery management controller 60 to only charge up the remaining controller. Alternatively, the first regulator 72 may be controlled to charge up both batteries but the second regulator 73 may be controlled such that the current will flow through the suitably charged battery and into the remaining battery, which may result in the suitably charged battery being "topped off."

As an alternative to steps 905 and 906, the user may select that both the batteries be charged at the same time. In this instance, the user may selected the charging rates upon which each battery should be charged. For example, if the user wishes to have both batteries charged at the same rate, the first and second regulators 72 and 73 may be controlled by the battery management controller 60 such that the same amount of current will flow into each battery, regardless of their respective states of charge. In addition, if the user wishes to have the batteries both be charged at different charging rates, the first and second regulators 72 and 73 may be controlled such that these rates can be accomplished by controlling the amount of current flow to each battery from the power generator and the amount of current flow from one battery to another. Thus, the battery management controller can control the first and/or second regulators to increase the amount of current flowing from the generator to one of the first and second batteries. Whether charged sequentially or concurrently, the power generator continues to recharge the batteries until they are both above a suitable respective threshold at which the recharging may cease or until the engine is stopped.

Referring back to step 904, if there is no user input, the battery management controller may determine the charging rates of the first and second batteries based on a level of charge. In one example, one battery (such as the first battery used as a starter battery) may be selected to be charged first over the other if it falls below a certain threshold (step 908), and then the remaining battery is charged after the selected battery is suitably charged (step 910). Alternatively, both batteries may be charged at different charging rates based on the level of charge of each battery or other similar criteria. Whether charged sequentially or concurrently, the power generator continues to recharge the batteries until they are both above a suitable respective threshold at which the recharging may cease or until the engine is stopped.

Figure 7:
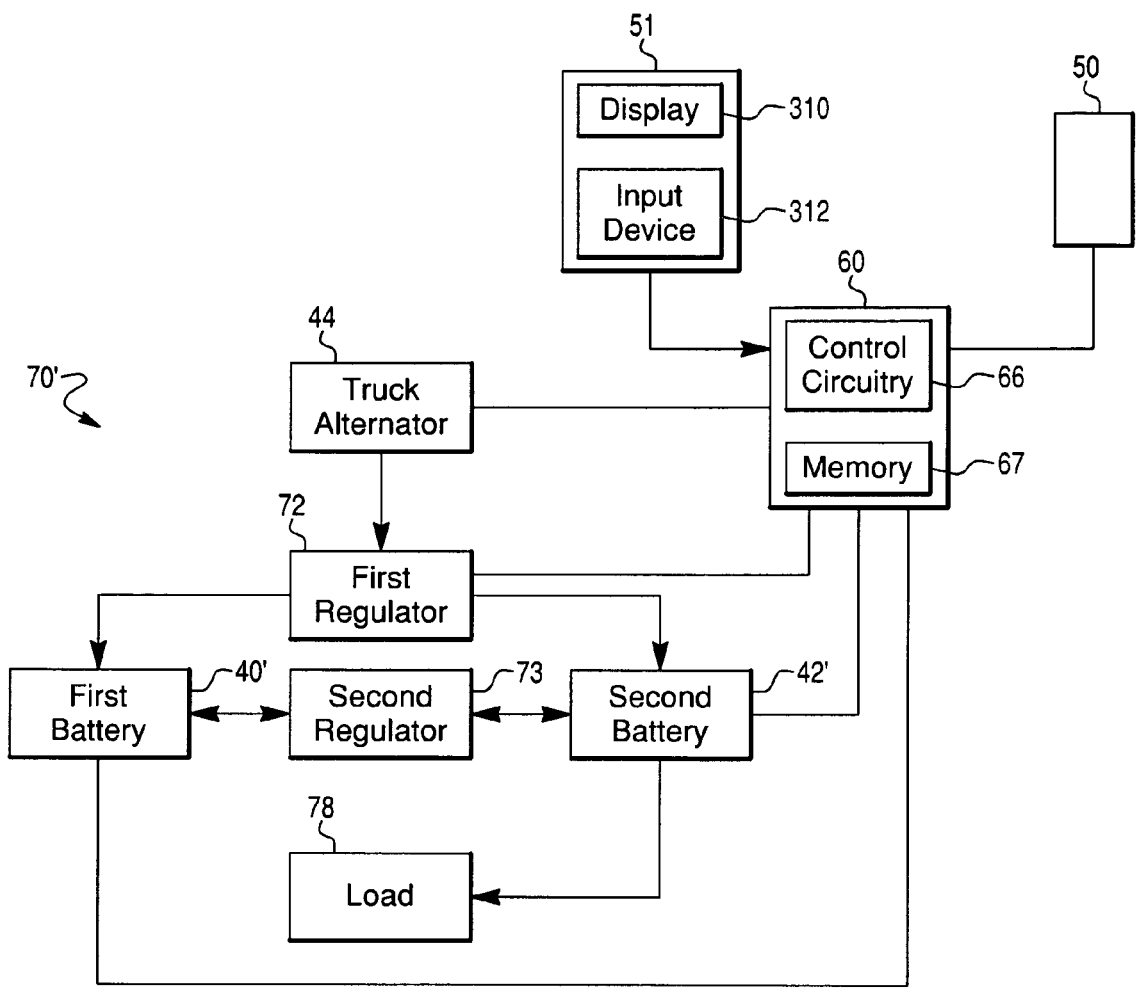
FIG. 7 shows a schematic diagram of a power system according to another embodiment of the present invention.

FIG. 7 shows another embodiment of the power system 70'. The configuration of the power system 70' is the same as the configuration of FIG. 5 with the following exceptions. First, the first battery 40' is not a starter battery but merely an auxiliary bank of batteries while the second battery 42' is the main bank of batteries. In addition, the third regulator has been removed and the power from the second battery is directly channeled into the load 78, such as the variable-speed HVAC system.

Figure 8:
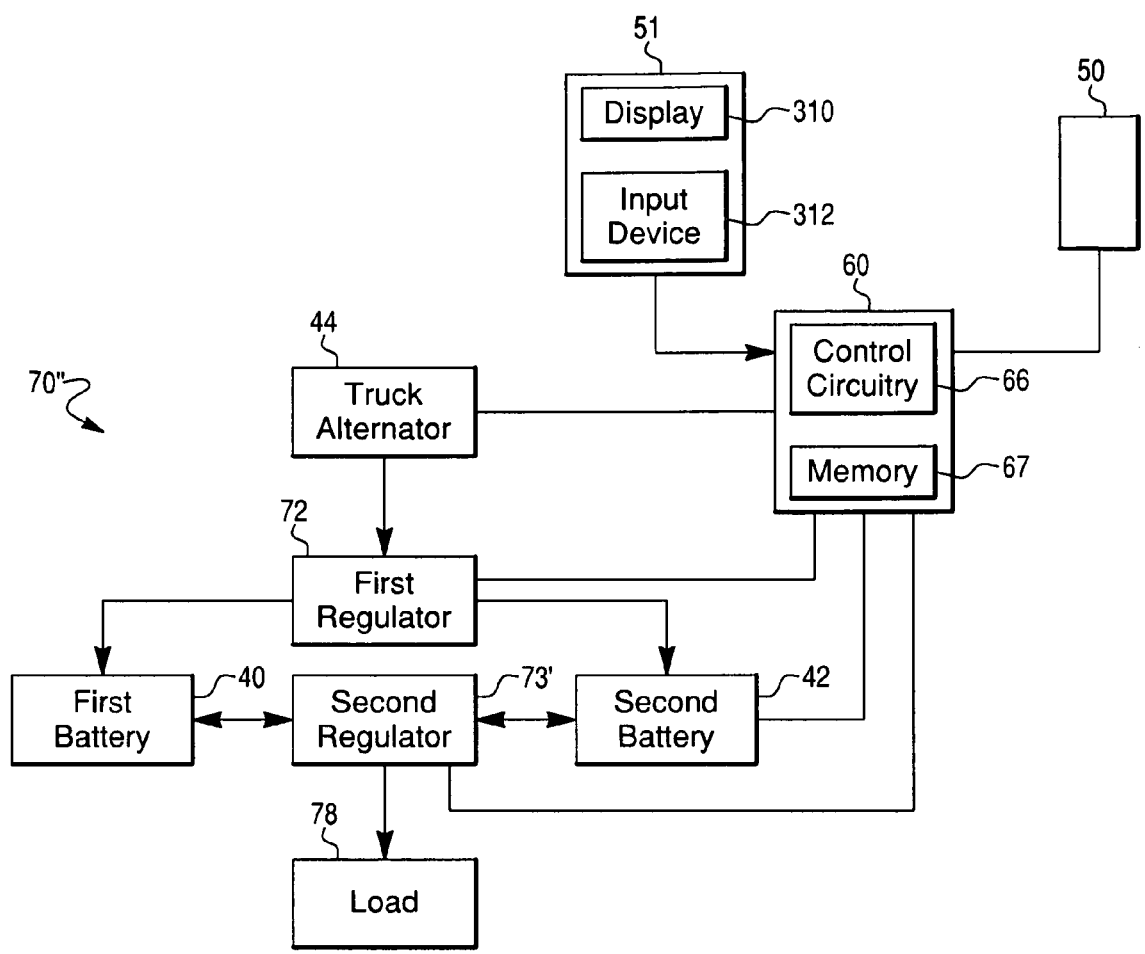
FIG. 8 shows a schematic diagram of a power system according to another embodiment of the present invention.

FIG. 8 shows another embodiment of the power system 70". The configuration of the power system 70" is the same as the configuration of FIG. 5 with the following exceptions.

First, the first battery 40' is not a starter battery but merely an auxiliary bank of batteries while the second battery 42' is the main bank of batteries. In addition, the third regulator has been removed and the power from the first and second batteries is fed into the load 78 via the second regulator 73'. The second regulator 73' acts as a buck/boost DC-to-DC converter and as the boost regulator to the load 78. The second regulator then permits current to flow between the first and second batteries as described in relation to the second regulator 73 in FIG. 5, but also current can flow from the first and/or second battery to the load 78 based on the duty cycle of the switching transistor associated with the respective first battery, second battery, and load 78.

Figure 9:
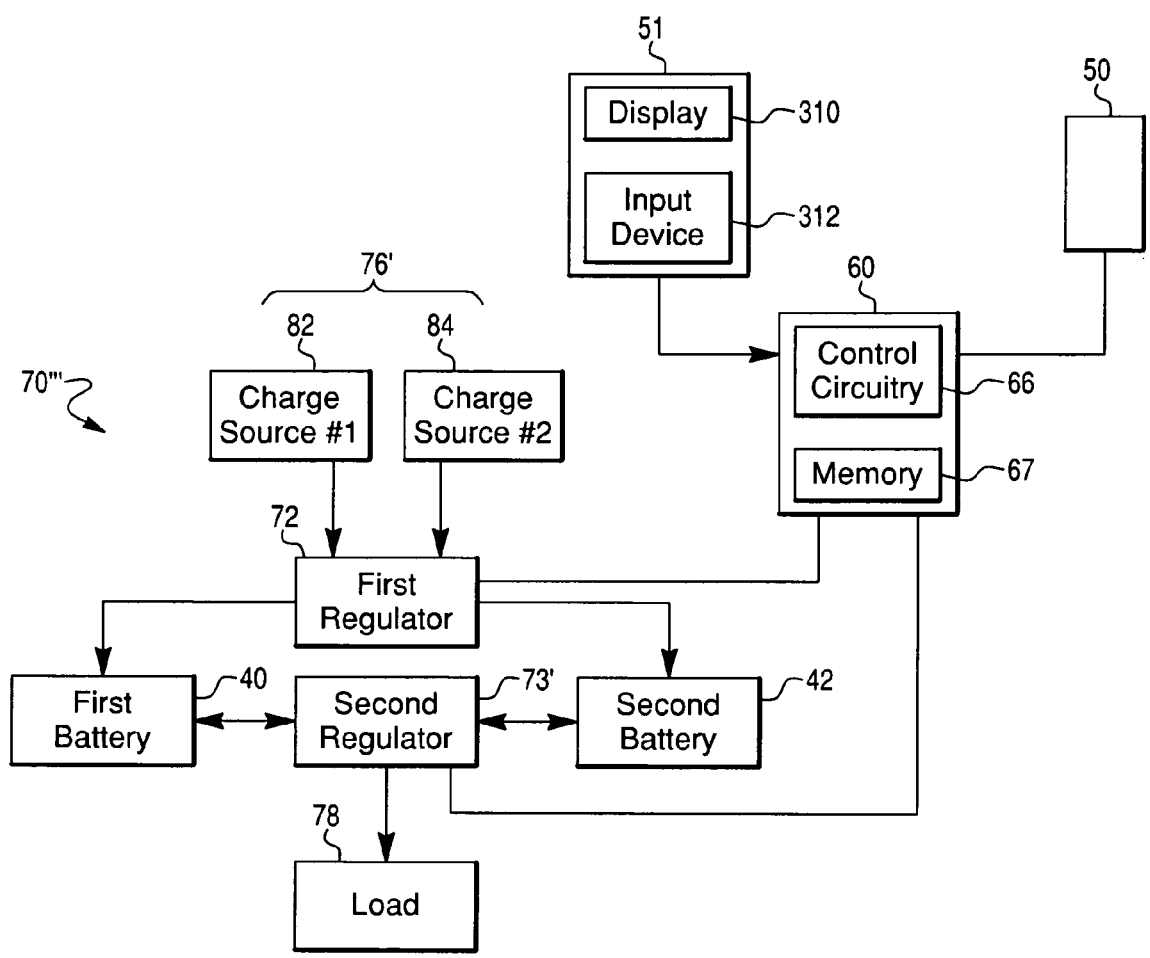
FIG. 9 shows a schematic diagram of a power system according to another embodiment of the present invention.

FIG. 9 shows another embodiment of the power system 70'''. The configuration of the power system 70''' is the same as the configuration of FIG. 8 with the following exception. Instead of an electrical power generator 76 comprising a single alternator, the power generator comprises two charging devices 82 and 84. Each charging device may be, for example, a wind turbine generator, a hydro turbine generator, a diesel generator, a gas turbine generator, an alternator, an AC source, one or more solar panels or any other power source. Both charging devices are connected to the first regulator 73.

Figure 10:
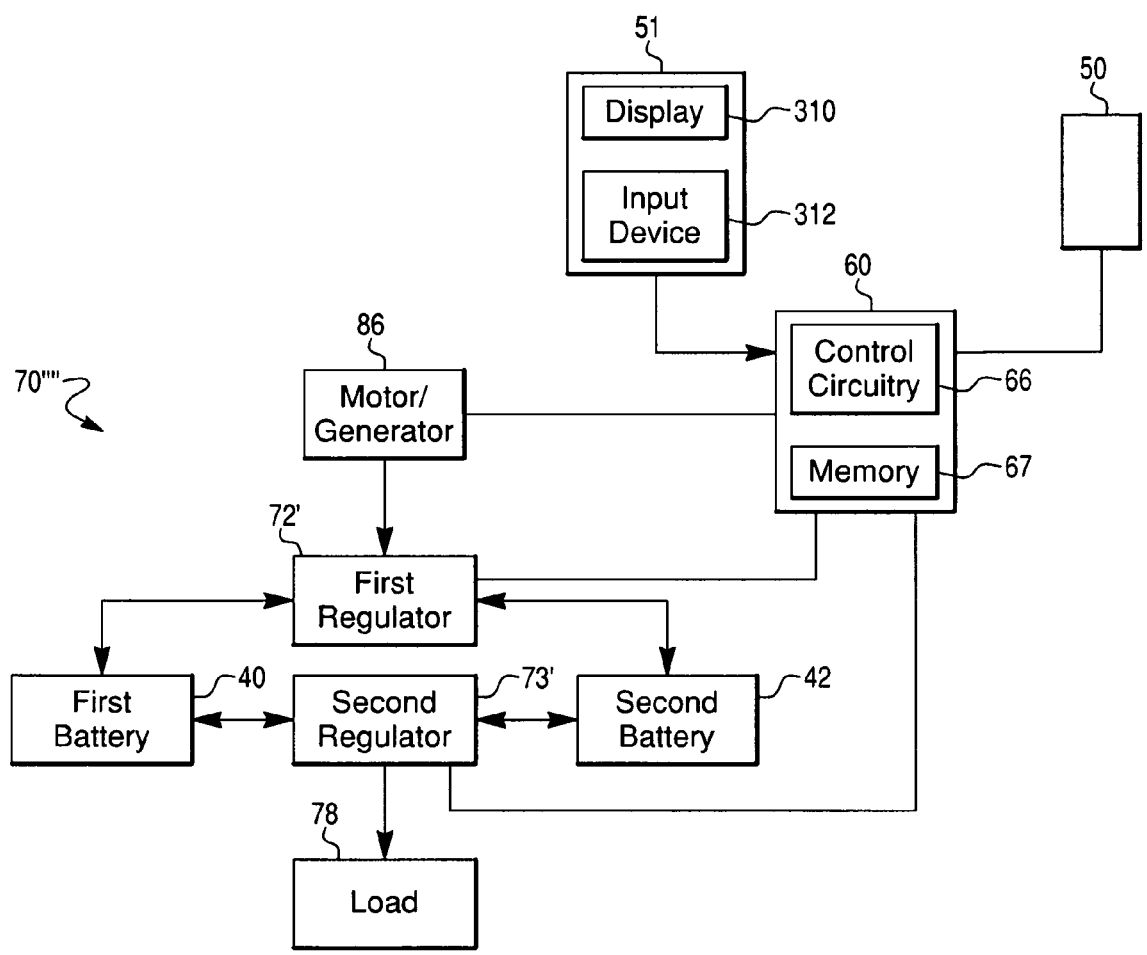
FIG. 10 shows a schematic diagram of a power system according to another embodiment of the present invention.

FIG. 10 shows another embodiment of the power system 70''''. The configuration of the power system 70'''' is the same as the configuration of FIG. 8 with the following exceptions. First, instead of an electrical power generator 76 comprising a single alternator, the power generator comprises a motor/generator 86. Second, the first regulator 72' acts as a buck/boost DC-to-DC converter from the first and second batteries to the motor generator 86. The first regulator then permits current to flow from the generator to the first and second batteries as described in relation to the first regulator 72 in FIG. 5, but also current can flow from either or both the first and second batteries to the motor 86 based on the duty cycle of the switching transistor associated with the respective first battery, second battery, and motor/generator 86. The battery management controller 60 may determine what mode the motor/generator is in, and whether power from the first and/or second batteries are required to power the motor/generator when in the motor mode.

In yet another embodiment of the power system, the configuration of the power system may be the same as the configuration of FIG. 5 with the following exception. One of the batteries is only charged by the other battery. For example, the first battery may be charged only by the second battery or the second battery may be only charged by the first battery. The configuration can be accomplished by removing the electrical connection from the first regulator to either one of the first and second battery. Alternatively, only one of the batteries is attached to the electric power generator 76 without even including the first regulator 72. In yet another alternative, the configuration may be the same as FIG. 5 but that the first and second regulators 72 and 73 are always controlled by the battery management controller 60 so that one of the batteries is only charged by the other battery.

Because the first and second power source may be batteries, they may benefit from a periodic controlled overcharge, which is often referred to as an equalization charge. The equalization charge mixes up the electrolyte, which tends to stratify or separate into overlapping layers of acid and water and also helps remove some sulfate deposits. During an equalization charge, the battery is charged well after the point at which the battery would be normally considered to be fully-charged while avoiding excessive battery heating or electrolyte boil-off. For example, a battery voltage is allowed to rise to a high voltage (such as approximately 16, 17, or more volts for a 12 volt battery), where it is maintained for a length of time (for example, up to 7, 8, 9 or more hours) by adjusting of the charging current. Of course, it should be kept in mind that if the first or second battery is a battery bank, the equalization charge would apply across the battery bank.

According to one embodiment of the present invention, the power generator 76 (such as an alternator) may be used to provide an elevated voltage for the equalization charge for one of the first (secondary) battery and the second (main) battery. For example, based on user input from the user interface 51, the battery management controller 60 may be configured to control the power system 70 to conduct an equalization charge of one of the first (secondary) battery and the second (main) battery using the electrical generator to raise an output voltage to an increased value greater than the normal output voltage in order to conduct an equalization charge of one of the first (secondary) battery or the second (main) battery. To achieve this rise in output voltage, the battery management controller 60 may adjust the excitation of the electrical generator.

According to another embodiment of the present invention, one battery may be used to elevate the charge of the other battery so that the other battery undergoes an equalization charge. For example, based on user input from the user interface 51, the battery management controller 60 may be configured to control the power system 70 to conduct an equalization charge of one of the first (secondary) battery and the second (main) battery using the other of the first (secondary) battery or the second (main) battery) by controlling the second regulator 72 such that a voltage difference is sufficiently created between the first and second batteries to cause a flow of current from one battery to the other such that the other battery undergoes an equalization charge.

Next, the HVAC component controller 50 will be described. The HVAC component controller 50 controls the components of the HVAC system 10, and works in conjunction with the battery management controller 60. The purpose of the HVAC component controller 50 is to: (1) communicate to the user via the user interface; (2) monitor safety functions and initiate appropriate responses; (3) maximize the operational efficiency of the HVAC system by optimizing the speed of the condenser and evaporator fans and the speed of the compressor motor according to ambient conditions and user preferences; (4) regulate the speed of the condenser fans to control the condenser temperature thereby obtaining the best compromise between increased fan motor power consumption and increased compressor motor power; (5) regulate the speed of the evaporator fan proportionate to the temperature differential between the user temperature set point and the actual ambient temperature; and (6) regulate the speed of the compressor motor to maintain the desired evaporator temperature.

Figure 11:
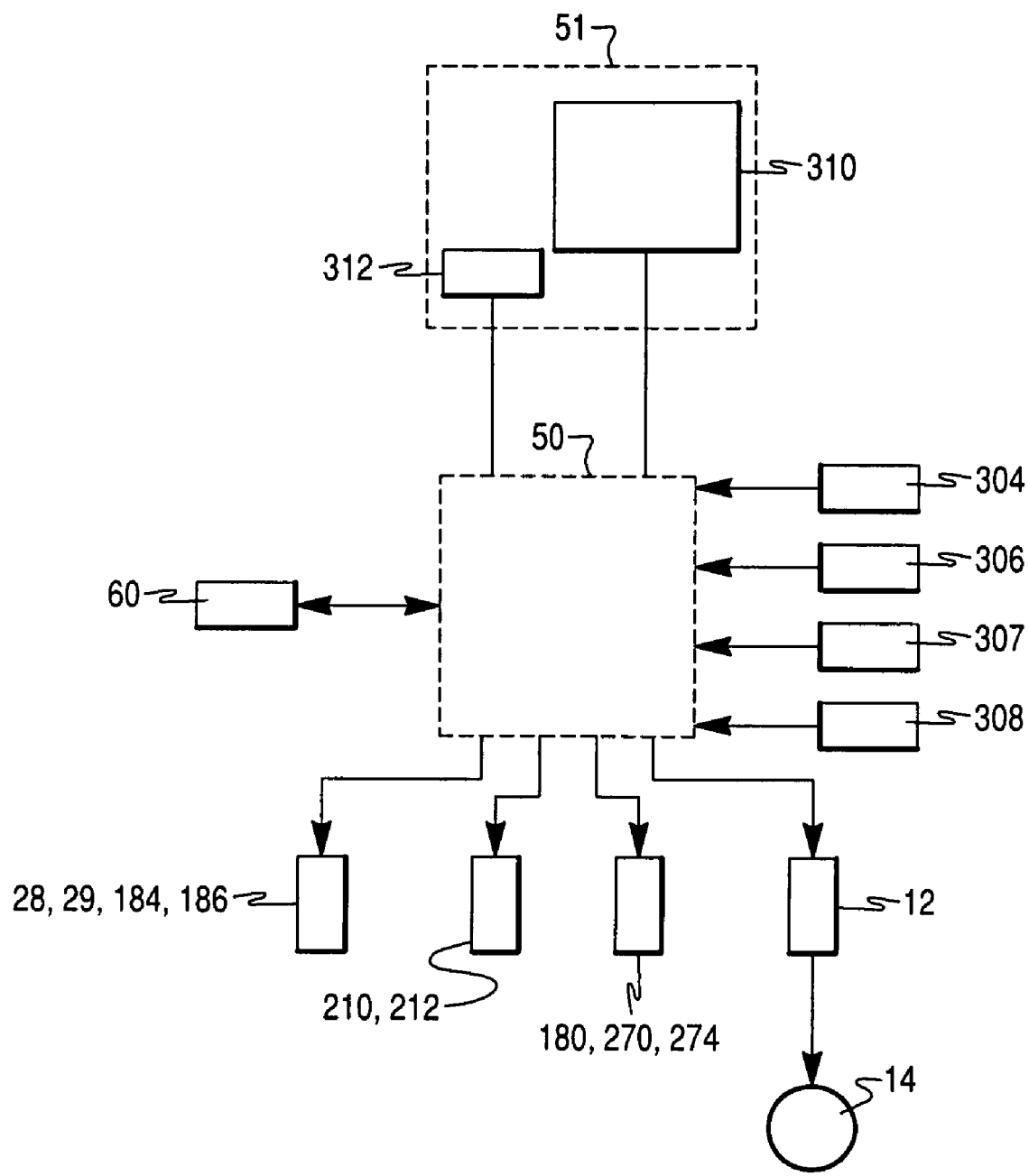
FIG. 11 is a schematic diagram of a HVAC component controller.

The HVAC component controller 50 carries out its function by being operationally connected to the battery management controller 60, the user interface 51 (which includes a display 310 and one or more inputs 312), a plurality of sensors, and the operational components of the HVAC system as show in FIG. 11. The plurality of sensor detects a variety of parameters including: the vehicle's interior ambient temperature detected by a temperature sensor 304, the humidity of the vehicle's compartments by using a humidity sensor 307, and noise and/or vibration from one or more noise or vibration sensors 308.

As to the operational components of the HVAC system, the HVAC component controller 50 may run the motor 12 that drives the compressor 14; the circulation blowers that blow the temperature-controlled air into one or more designated compartments (such as the vehicle compartment 23 and/or the sleeping compartment 27); the heaters for the heating system (such as the air heaters 272 and 274 from FIG. 1 or the heater 180 from FIG. 2); and the control doors (if applicable) for the regulation of the temperature. Additionally the HVAC component controller 50 may also switch any control valves to control the flow of refrigerants (such as the valves 28 and 29 from FIG. 1 or the valves 184 and 184 from FIG. 2). In one embodiment, the motor 12 of the compressor 14 may be controlled by the HVAC component controller 50 using a closed loop proportional, integral, derivative (PID) control. Similarly, the HVAC component controller 50 may also control the fan speed of the circulation blowers 210 and 212 via a pulse width modulated (PWM) PID control loop that is independent of the control for the compressor.

In one embodiment, the HVAC component controller 50 may modulate the speed of the motor 12, and thus may modulate the capacity of the compressor 14 driven by the motor 12. The modulation of the compressor may range between an upper compressor capacity and a lower compressor capacity. The compressor capacity may vary depending on the compressor capacity required to maintain the evaporator 22 or 26 at the evaporator temperature $T_E$ as commanded by the control logic circuit 66.

Figure 12:
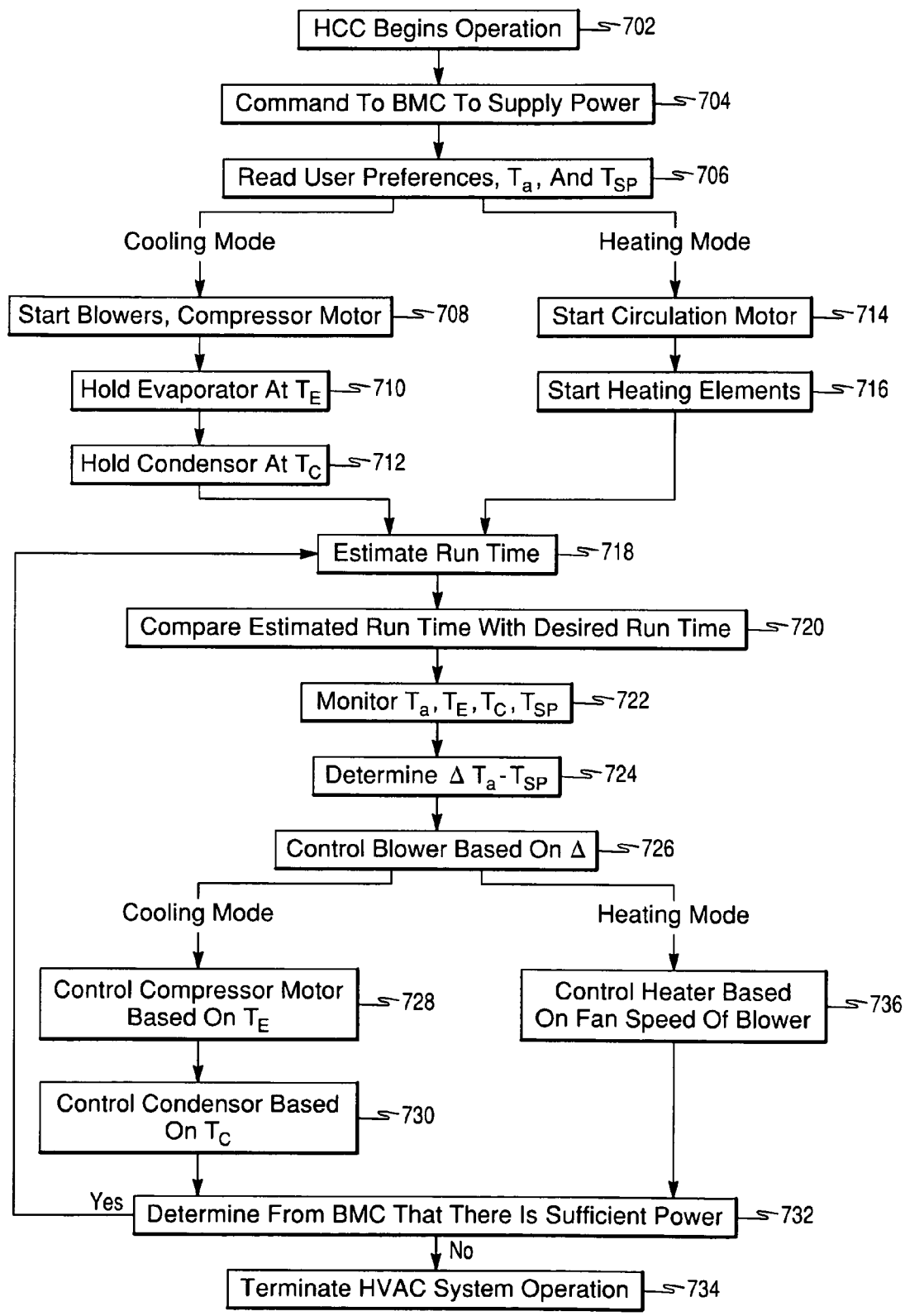
FIG. 12 is a flow chart showing the operation of the HVAC component controller.

In one exemplary embodiment of the present invention, the HVAC component controller 50 ("HCC") may work as described below with reference to FIG. 12. The HVAC component controller 50 receives a signal from the user interface 51 to begin operation at step 702. Commands are sent to the battery management controller 60 ("BMC") from the HVAC component controller 50 to supply power to the HVAC system 10 at step 704. The user interface 51 is polled for the user preference settings, such as the mode of operation, the location of temperature control, and the desired set point temperature $T_{sp}$. Also the ambient temperature $T_a$ is read from the temperature sensor 304 at step 706.

If the user preference is for the "cooling" mode, the process is sent to step 708 where a command is issued to start all fans of the circulation blowers 210, 212 and the motor 12 of the compressor 14 to a minimum speed. At step 710, the compressor speed is then commanded to bring and hold the evaporator 22 to a predetermined evaporator temperature $T_E$ if the vehicle compartment is being cooled or to bring and hold the evaporator 26 to a predetermined evaporator temperature $T_E$ if the sleeping compartment is being cooled. At step 712, the fans of the condenser 16 are commanded to bring and hold the condenser 16 to a predetermined condenser temperature $T_C$.

If the user preference is for the "heating" mode, a command from the HVAC component controller 50 is issued at step 714 to start the fans of the circulation blowers of the evaporator 22 or 26. The electric heating element 270 or 274 is commanded at step 716 to a power level (via PWM control) proportionate to the fan speed of the circulation blowers of the evaporator 22 or 26.

With the HVAC system 10 now running in either the heating or cooling mode, the battery management controller 60 is polled for an estimate of the run time based on the present power draw and stored energy available for use in step 718. As step 720, the estimated run time is compared to the desired run time which was programmed into the user settings by the user using the user interface 51. The HVAC component controller factors the difference between the estimated and desired run times into planning the output of the HVAC system 10 to ensure that sufficient power is available for the duration of the heating or cooling period (also called the "run time plan"). Based on the run time plan, the HVAC component controller 50 may increase or decrease the average capacity of the HVAC system periodically throughout the cycle. In particular, if the amount of heating (steps 726 and 736) or the amount of cooling (steps 726, 728, and 730) would require too much power to be drawn from the power source (s), the highest capacity of the HVAC system 10 possible would be employed which would still allow the battery management controller to supply power through the entire operational period. The highest capacity possible may be obtained through a combination of settings which would offer the best efficiency for the prevailing conditions.

At step 722, a variety of measurements are taken at step 722 so as to ensure that the HVAC system runs efficiently with its limited power supply. These measurements include the actual ambient temperature of the vehicle's interior $T_a$, the evaporator temperature $T_E$, and the condenser temperature $T_C$. At step 722, temperature sensors on the evaporator measure the evaporator temperature $T_E$, temperature sensors on the condenser measure the condenser temperature $T_C$, sensors in the vehicle and/or sleeping compartments measure the ambient temperature $T_a$, and the user inputs the desired ambient temperature or the set point temperature $T_{sp}$ via the user interface 51.

For efficient operation of the HVAC components in either the cooling or heating mode, a calculation is made at step 724 in which a difference $\Delta$ between the ambient temperature $T_a$ and the set point temperature $T_{sp}$ is determined. Then, the circulation blowers at the evaporator 22 or 26 are commanded to a speed proportionate to the difference $\Delta$ at step 726. The determination of an appropriate fan speed for the blowers at the evaporator based on a given $\Delta$ may be based on any one of a number of methods known in the art such as tabular formulations or computer models.

The air blown into the vehicle and/or sleeping compartments affects the ambient temperature of the compartment; thus with continued operation of the HVAC system, the difference ($\Delta$) between the ambient temperature $T_a$ and the set point temperature $T_{sp}$ begins to decrease. As the ambient temperature $T_a$ nears the set point temperature $T_{sp}$ the HVAC component controller 50 reduces the fan speed of the circulation blowers at the evaporator 22 or 26 proportionately based on $\Delta$, as seen in step 726. If the system is in the cooling mode, the reduced air flow over the evaporator 22 or 26 causes the evaporator temperature $T_E$ to fall. In response, the HVAC component controller 50 adjusts the speed of the motor 12 that drives the compressor 14 to maintain the desired evaporator temperature $T_E$ at step 728. Similarly, the changing capacity of the evaporator 22 or 26 also changes the temperature of the condenser $T_C$. Again, the HVAC component controller 50 adjusts the fan speed of the condenser 16 so as to maintain the desired condensing temperature $T_C$ at step 730. However, the settings for the circulation blowers, the compressor, and the condenser (which are set in steps 726, 728, and 730 respectively) are subject to the highest possible capacity of the HVAC system based on the run time plan. Thus, if too much power would be drawn by these components while running at the most efficient operation, the settings of these components would be adjusted so as to allow the system to run for the desired run time while operating as close as possible to the most efficient operation determined by $\Delta$.

The process continues to step 732 where the HVAC component controller receives data from the battery management controller 60 about whether there is sufficient power being supplied. If there is sufficient power (the "YES" path), the process returns to step 718 and the process is repeated. If there is insufficient power (the "NO" path), the operation of the HVAC system is terminated at step 734.

If the HVAC system is operating in heating mode rather than the cooling mode, the HVAC component controller 50 alters the PWM cycle of the resistive heating elements 270 or 274 to match the changing fan speed of the circulation blower at the evaporator 22 or 26. In this way, the temperature of the discharged air remains constant. Thus, step 736 is carried out in FIG. 12 instead of steps 728 and 730. Similar with the cooling operation, the settings for the circulation blowers and the heater (which are set in steps 726 and 736 respectively) are subject to the highest possible capacity of the HVAC system based on the run time plan. Thus, if too much power is being drawn by these components while running at the most efficient operation, the settings of these components may be adjusted so as to allow the system to run for the desired run time while operating as close as possible to the most efficient operation determined by Δ. For example, the settings of the circulation blowers may be lowered to a level that permits operation during the entire desired run time while still operating as close as possible to the settings for the most efficient operation based on A.

Other system parameters may be used to control the motor-driven compressor 14 and the circulation blowers 210 and 212. For example, the HVAC component controller 50 may also monitor humidity of the vehicle's compartments by using a humidity sensor 307. If the humidity of the compartments is above a predetermined threshold (which may be set by the vehicle occupant), the HVAC component controller 50 may control the compressor 14 to speed up (up to but not exceeding the upper compressor capacity) and the circulation blowers 210 and 210 to slow down.

Furthermore, one or more noise or vibration sensors 308 may be used to determine the level of noise or vibration of the HVAC system 10. Once the signal is sent to the HVAC component controller 50, the controller 50 determines whether there is a need to speed up or slow down the compressor and/or blower, and to control the compressor and/or blower accordingly.

The use of one or more system parameters, such as the evaporator temperature, the humidity, the exterior ambient temperature, the vehicle's interior temperature, etc. to control the compressor and blower capacities may be accomplished by monitoring the one or more system parameters and using a program in the HVAC component controller 50 that was compiled using, for example, a multivariate model known in the art.

Other system parameters may also be provided to the HVAC component controller 5, which may allow the HVAC component controller 50 to detect faults within the HVAC system. For example, performance and safety functions are monitored and an appropriate response by the HVAC component controller 50 may be initiated, such as shutting down the system in the event of the overheating of the motor 12 of the compressor 14.

Figure 13:
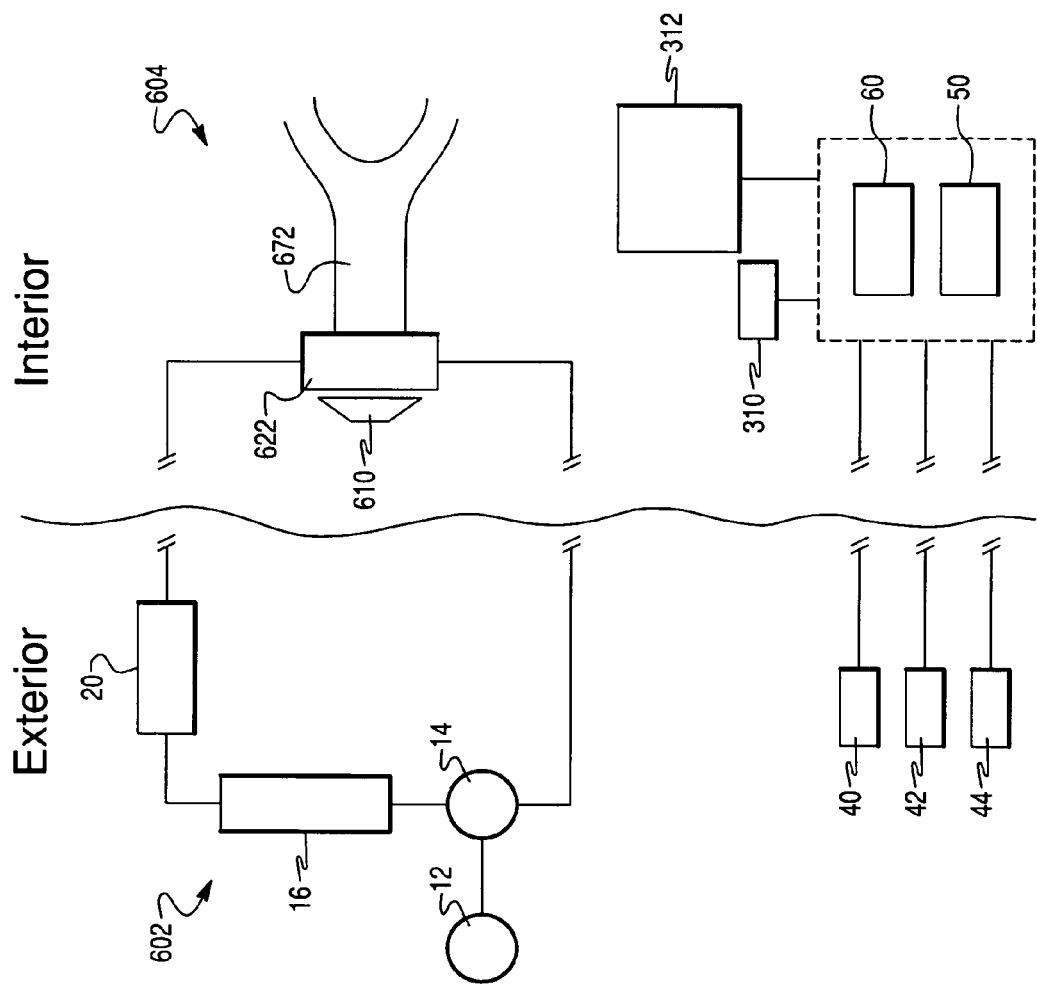
FIG. 13 is a schematic diagram of an HVAC system to be installed in a vehicle.

FIG. 13 shows another embodiment of the HVAC system according to the present invention. The embodiment in FIG. 13 is similar to the embodiment of FIG. 1; however, FIG. 13 shows how the HVAC system may be divided up into a split system 600 in which there is an exterior subsystem 602 and an interior subsystem 604. The exterior subsystem 602 may comprise components that are located on the exterior area of the vehicle's cab. The interior subsystem 604 may comprise components that are located in the interior area of the vehicle's cab, wherein the interior area includes a driver compartment and a sleeper compartment. The driver compartment is at least partially segregated from the sleeper compartment. FIG. 13 shows an exterior subsystem 602 that comprises a motor 12, a compressor 14, a condenser 16, and a first power source, which are located outside the cab of a large vehicle, such as a truck. In addition, the second power source and the electrical power generation system 44 may also be located on the exterior of the vehicle's cab as is conventional with large vehicles. The exterior subsystem is mounted to a location outside the interior area. For example, the exterior subsystem is mounted to a rear side of the interior area or is mounted underneath the interior area.

The interior subsystem is mounted within the interior area and is to be operably connected with the exterior subsystem. The interior subsystem may mounted in the sleeper compartment, such as underneath a bed in the sleeper compartment. The interior subsystem 604 may comprise the circulation blower 610, the evaporator 622 and the HVAC component controller 50, the battery management controller 60, the display 310, and the input device 312, which are all located inside the cab of the vehicle. The temperature controlled air may be optionally channeled into ducts 672, which may split into two or more ducts that may lead to different compartments or areas of the interior of the vehicle's cab. In one embodiment, the ducts 672 may be the vehicle's own ducting which is already installed in the vehicle cab. Additionally, the interior subsystem 604 may comprise the vehicle's already existing evaporator 622 and circulation blower 610. In such a situation, the exterior subsystem 602 may be configured to be able to connect to a plurality of different evaporators, such as the vehicle's own evaporator. In addition, the exterior subsystem 602 may be configured to connect to a plurality of evaporators at one time, such as one evaporator for cooling/heating the driving compartment and one evaporator for cooling/heating the sleeping compartment.

In FIG. 13, the refrigerant metering device is located exterior to the vehicle's cab as part of the exterior subsystem 602, which allows the servicing of the metering device to be easier if it should fail. Alternatively, the refrigerant metering device 20 may be located in the interior of the cab as part of the interior subsystem 604.

Figure 15:
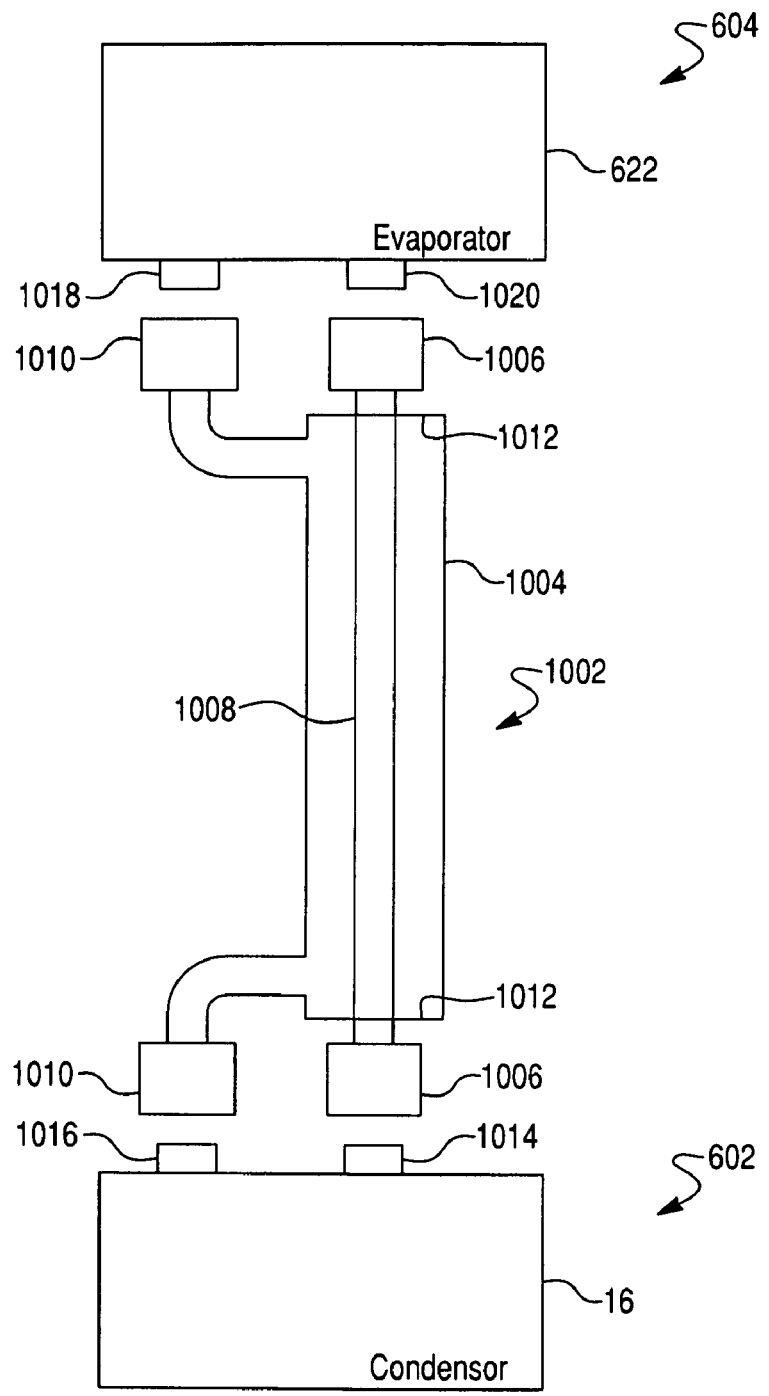
FIG. 15 is a liquid phase cooler connecting the interior and exterior subsystems of FIG. 13.

The interior and exterior subsystems may be connected to each other by a liquid phase cooler 1002, as shown in FIG. 15. The liquid phase cooler 1002 comprises an outer tube 1004 with two first connectors 1010 and an inner tube 1008 with two second connectors 1006. The inner tube 1008 is placed within the outer tube 1004. The tube may be made of any suitable material, such as plastic. Liquid refrigerant can be transferred within the inner tube 1008 or in the outer tube 1004 while gas refrigerant can be transferred in the other tube. The ends 1012 of the outer tube 1004 are sealed so that the fluid running between the inner wall of the outer tube and the outer wall of the inner tube does not leak. If liquid refrigerant is transferred between the inner wall of the outer tube and the outer wall of the inner tube, there is an additional benefit that insulation would not be needed. Furthermore, the boiling of liquid caused by the heating of the liquid by the sun is inhibited; thereby improving the efficiency of the cooling. Also, having one tube inside another would effectively be similar to having a single tube, which would be easier to attach to the back of a truck.

According to one embodiment, the exterior subsystem 602 further includes a quick connect inlet port 1014 and a quick connect outlet port 1016. The interior subsystem 604 further includes a quick connect inlet port 1018 and a quick connect outlet port 1020. The inner and outer tubes 1004 and 1008 are first and second quick connect lines, respectively, for operably connecting the exterior subsystem 602 and the interior subsystem 604. The first quick connect line 1008 connects the quick connect inlet port 1014 of the exterior subsystem 602 and the quick connect outlet port 1020 of the interior subsystem 604. The second quick connect line 1004 connects the quick connect inlet port 1018 of the interior subsystem 604 and the quick connect outlet port 1016 of the exterior subsystem 602.

Figure 16A:
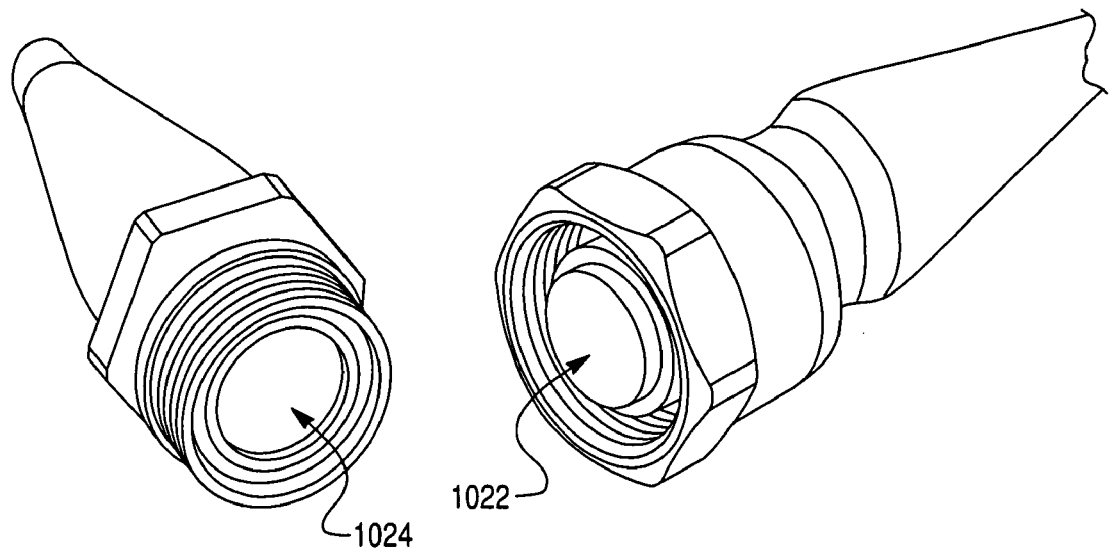
FIG. 16(a) is a perspective frontal view of low-loss quick connectors for connecting the liquid phase cooler according to an embodiment of the present invention.

The quick connect inlet port 1014 and the quick connect outlet port 1016 of the exterior subsystem 602 and the quick connect inlet port 1018 and the quick connect outlet port 1020 of the interior subsystem 604 may be low loss quick connect ports. The first and second quick connect lines 1004 and 1008 may be low loss quick connect lines with low loss quick connectors 1006 and 1010, as seen in FIG. 16(a). For low loss quick lines, fluid is retained in the lines because of spring-loaded seals 1024 located in the connectors 1006 and 1010. When the connectors 1006 and 1010 are attached to their respective mating ports 1014, 1016, 1018, and 1020, a plunger 1022 within the respective port depresses the spring loaded-seal 1024, thus permitting fluid to flow through the connect lines. When the connectors and ports are disconnected, the plunger 1022 removes its pressing force from the spring-loaded seal 1024, thus permitting the seal 1024 to spring back into its sealing position, which allows the fluid within the connect lines to be retained. Therefore, the low loss quick connect ports and the low loss quick connect lines 1004 and 1008 removably connect so that connection and disconnection can take place multiple times with low loss of refrigerant fluid.

Figure 16B:
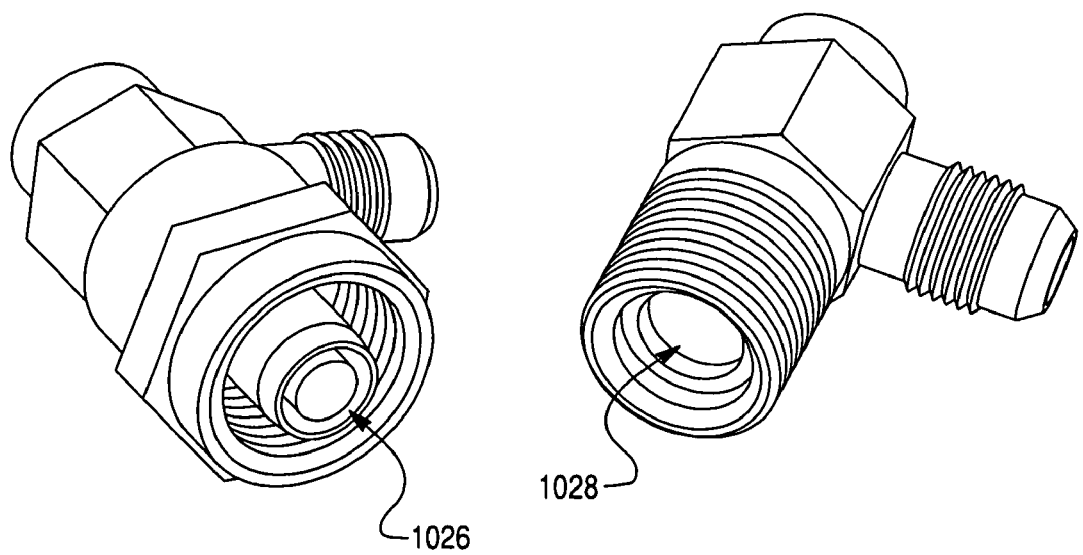
FIG. 16(b) is a perspective frontal view of one-time quick connectors for connecting the liquid phase cooler according to an embodiment of the present invention.

Alternatively, the quick connect inlet port 1014 and the quick connect outlet port 1016 of the exterior subsystem 602 and the quick connect inlet port 1018 and the quick connect outlet port 1020 of the interior subsystem 604 may be one-time quick connect ports. The first and second quick connect lines 1004 and 1008 may be one-time quick connect lines with one-time quick connectors 1006 and 1010, as seen in FIG. 16(b). For one-time quick lines, fluid is retained in the lines because of membranes 1028 located in the connectors 1006 and 1010 providing a seal. When the connectors 1006 and 1010 are attached to their respective mating ports 1014, 1016, 1018, and 1020, a knife-edge 1026 punctures or ruptures the membrane 1028 within the respective port; thus permitting fluid to flow through the connect lines. The one-time quick connect ports and the low loss quick connect lines 1004 and 1008 will leak if the connectors are removed from their respective ports but provides the advantage of being smaller than the low-loss connectors.

Of course, other connectors and lines may be used for the connectors 1006 and 1010 and the connect lines 1004 and 1008. For example, the connectors 1006 and 1010 may have flared fittings, sealed fittings, etc. Additionally, various combinations of fitting may be used. For example, both connectors 1010 and 1006 may be low-loss quick connectors, one-time quick connectors, or a combination thereof. According to one embodiment, one of the connectors 1010 and the connectors 1006 are low-loss connectors while the other of the connectors 1010 and the connectors 1006 are one-time quick connectors. According to another embodiment, the connectors 1006 and 1010 that lead to the evaporator 622 (i.e., connecting to the inlet port 1018 and the outlet port 1020 of the interior subsystem 604) may be one-time quick connectors while the connectors 1006 and 1010 that lead to the condenser 16 (i.e., connecting to the inlet port 1014 and the outlet port 1016 of the exterior subsystem 602) may be any suitable connector, such as one-time quick connectors, low-loss quick connectors, flared connectors, etc.

The split system 600 has several advantages. First, less interior space is taken up by the system because a substantial portion of the components are located exterior to the vehicle's cab. Additionally, the vehicle's existing ducts may be used so that no additional ducting is needed. Thus, the system may have an easier installation process, improved efficiency, and quieter operation.

The disclosed battery management controller and HVAC system may provide temperature control to a vehicle occupant for extended periods of time when the vehicle's engine is not running. In addition, the system ensures sufficient battery power to start the vehicle even when the HVAC system has been running for a period of time when the engine has been turned off. The battery management and HVAC systems may be used in large trucks, such as 18 wheelers, as well as any other type of vehicle.

During operation, the HVAC component controller 30 processes the user inputs to determine the operational mode of the HVAC system 10. When either the heating or cooling mode of operation is selected and when the engine is turned on, the vehicle electrical power generation system is used to power the necessary components. For example, the heater and circulation blowers are turned on during the heating mode of operation while the compressor, circulation blowers, and pumps are turned on during the cooling mode of operation.

When the heating mode is operating when the engine is turned off, the HVAC component controller 50 commands a heater (such as the coolant heater 180 in FIG. 2 or the air heaters 270 and 274 in FIG. 1) and the circulation blowers 210 and 212 to turn on. The HVAC component controller 50 also controls the speed of the circulation blowers 210 and 212 via a pulse width modulated (PWM) PID control loop in order to maintain the temperature of the driving and/or sleeping compartment at the interior set point temperature. With the various disclosed embodiments, the heating of the interior of the cab may be performed without relying on diesel fuel but may be run purely by battery power. Thus, the heating may be performed without relying on the vehicle's engine being turned on.

When the cooling mode of operation is used when the engine is turned off, the circulation blowers 210 and 212, the compressor 14 and/or the pump 176 are turned on. The HVAC component controller 50 modulates the capacity of the compressor 14 and the circulation blowers 210 and 212 to maintain the temperature of the driving and/or sleeping compartment at the interior set point temperature via PID control.

In either the heating or cooling mode when the engine is turned off, if the voltage of the combination of the first and second power sources drops below a predetermined amount, the first and/or second power source is disconnected and the HVAC system is only powered by the remaining power source. Once the voltage of the remaining power source drops below another predetermined level, the battery management controller 60 may be configured to disconnect the remaining power source, thus shutting down the HVAC system 10.

Upon start up of the vehicle, the alternator or other charging device may be used to charge up the first and second power sources (if they are batteries) so that they are fully charged. In one embodiment of the present invention, the battery management controller 60 may also be used to connect the first power source (such as an auxiliary battery or bank of auxiliary batteries) during the start up of the vehicle in the situation where the second power source (such as the starter battery or bank of batteries) is too weak to start the vehicle, such as in the case where the starter battery is weakened because of very low exterior ambient temperatures.

Furthermore, the HVAC system may be a split system with a substantial portion of the components exterior to the vehicle's cab such that less interior space is taken up by the HVAC system. Also, the vehicle's existing evaporator and/or ducting may be used with the HVAC system for an easier installation process, improved efficiency, and quieter operation.

Figure 14:
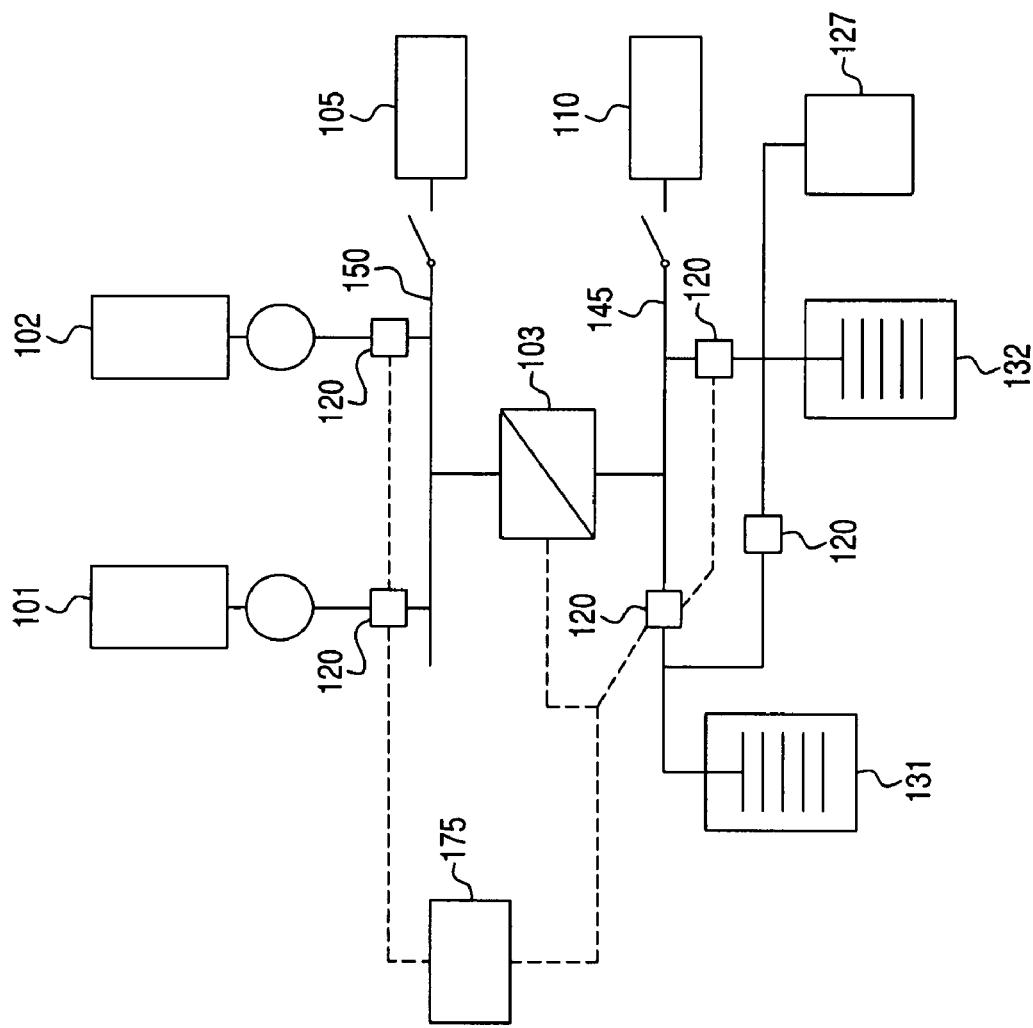
FIG. 14 is a power generation system including a battery management controller.

Operation of the battery management controller will now be described in general with regard to FIG. 14, which discloses a power generation system. FIG. 14 discloses a power generation system including a pair of power generators 101, 102. The generation system also includes main and auxiliary battery systems 131, 132. The power generators are connected to an AC power distribution bus 150 and the battery systems are connected to a DC power distribution bus 145. Although AC and DC busses are shown, the power generation system may include a single DC bus. The power generation system includes AC load(s) 105 and DC load(s) 110. As mentioned above, the loads may be supplied by a single DC distribution bus and individual inverters provided for each AC load. As shown in FIG. 14, the power generation system may include an inverter 103 for converting AC to DC power. Alternatively, the system may include a motor/generator set for handling DC/AC or AC/DC power conversion.

As shown in FIG. 14, the system includes AC power generators but, alternatively, a primary source of DC power may be provided. The power generators 101, 102 may serve as a charge source for the battery systems 131, 132. For example, the power generators may include, for example, a wind turbine generator, a hydro turbine generator, a diesel generator, and a gas turbine generator, etc. The power generation system may include several power transfer units (PTUs) 120 controlled by a battery management or system controller 175. The PTUs may simply be switches controlling the flow of power along their respective lines The PTUs may be mounted on one or more printed circuit boards and connected to the necessary wiring, electrical connections, and/or bus bars by any suitable means, such as wave soldering. The system may also include a power booster unit 127 (as described above).

The battery management controller 175 may include a control logic circuit and a memory, and may be connected to various system sensors. The battery management controller may be used to regulate the degree of discharge among the power sources so as to conform to the user preferences for battery change and use of various power sources. The memory 67 of the battery management controller may be used to log historical data and use the historical data to modify the operation of the system.

In one exemplary embodiment, the power generator 102 corresponds to a wind turbine generator used for battery charging. The controller 175 is configured to control the system so that the battery could either receive power from the generator 102 or provide power (i.e., motorize) the wind turbine. For example, during periods of no or little wind, the battery (or batteries) could be employed to power the generator 102 to drive the turbine blades and keep the blades spinning at a reasonable rate of speed. Maintaining the turbine rotating, would improve the efficiency of the wind turbine because when the turbine is always ready to make efficient use of each gust of wind to once again charge the batteries. There would be no losses associated with starting or speeding up the turbine.

The system FIG. 14 is an exemplary power generation system that may operate on similar principles to those described above with regard to FIGS. 1-8. However, FIG. 14 demonstrates that the concepts herein have broad applicability to various power generation systems including multiple power sources including stored energy and rechargeable power sources.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A power system to be installed in a vehicle comprising:
a first battery having a first battery voltage and a second battery having a second battery voltage;
an electrical power generator configured to charge the first battery;
an electrical load powered by at least one of the first battery, the second battery or the electrical power generator;
a converter connected to both the first and second batteries and configured to operate in either a neutral mode or a first battery charging mode or a second battery charging mode, wherein the converter is configured to create a voltage difference between the first and second batteries in the charging modes; and
a battery management controller configured to monitor the first voltage of the first battery and the second voltage of the second battery and/or to monitor current flow to and from the first and second batteries, and wherein the controller controls operation of the converter to operate in either the neutral mode, the first battery charging mode or the second battery charging mode;
wherein in the second battery charging mode, the converter is configured to adjust the voltage difference between first battery and the second battery to cause current to flow from the first battery to the second battery to thereby charge the second battery.

2. The system of claim 1, wherein the second battery is only charged by the first battery.

3. The system of claim 1, further comprising a user interface configured to allow a vehicle occupant to select the operating mode of the converter.

4. The system of claim 1, wherein the generator comprises an alternator configured to be driven by an engine of the vehicle.

5. The system of claim 4, wherein the controller is configured to control excitation of the alternator in order to control alternator output voltage.

6. The system of claim 1, wherein in the first battery charging mode, the converter is configured to adjust the voltage difference between the first battery and the second battery to cause current to flow from the second battery to the first battery to thereby charge the first battery.

7. The system of claim 1, wherein in the neutral mode the converter is configured so that no current flows between the first and second batteries.

8. The system of claim 1, wherein the electrical load comprises a system for heating a compartment of the vehicle.

9. The system of claim 1, wherein the electrical load comprises a system for cooling a compartment of the vehicle.

10. The system of claim 1, further comprising a current regulator connected to the generator and at least one of the first and second batteries, wherein the controller controls the current regulator to regulate the amount of current flowing from the generator to the at least one of the first and second batteries.

11. The system of claim 10, wherein the controller is configured to control the current regulator and the converter to adjust relative charging rates of the first and second batteries.

12. The system of claim 1, further comprising a boost converter connected to at least one of the first and second batteries and the load, wherein the boost converter raises the voltage being supplied to the load by the at least one of the first and second batteries.

13. The system of claim 12, wherein the controller controls the boost converter to adjust the power being supplied to the load from the at least one of the first and second batteries.

14. The system of claim 1, wherein one of the first and second batteries is connected to a vehicle starting system to provide power to start an engine of the vehicle.

15. A vehicle power system comprising:
an electrical generator driven by an engine of a vehicle,
a main battery connected to a secondary battery for supplying current an electrical load; and
a controller coupled to the main battery and the secondary battery; and wherein the controller is configured to adjust the system so that the main battery is charged by the secondary battery when a state of charge of the main battery is below a predetermined threshold even when a state of charge of the secondary battery is less than the state of charge of the main battery.

16. The system of claim 15, further comprising a converter connected between the main and secondary batteries to control current flow between the main battery and the secondary battery.

17. The system of claim 16, wherein the controller is configured to control the system to conduct an equalization charge of one of the main battery and secondary battery using the other of the main battery and the secondary battery.

18. The system of claim 15, wherein the controller is configured to control the generator to raise an output voltage to an increased value greater than a normal output voltage in order to conduct an equalization charge of one of the main battery and the secondary battery.

19. The system of claim 18, wherein the controller adjusts excitation of the generator in order to raise the output voltage.

20. The system of claim 18, further comprising a current regulator connected to the generator and at least one of the main battery and the secondary battery, wherein the controller controls the current regulator to increase the amount of current flowing from the generator to the one of the main and secondary batteries being charged.

21. The system of claim 15, wherein the main battery is used as a starter battery, and the determined threshold is a level of charge sufficient to start the engine of the vehicle.

22. The system of claim 21, wherein the controller is configured to adjust the system so that the secondary battery charges the main battery to the predetermined level sufficient to start the engine of the vehicle even if the state of charge of the secondary battery is less than the state of charge of the main battery.

* * * * *